US008533653B2

(12) United States Patent
Anai et al.

(10) Patent No.: US 8,533,653 B2
(45) Date of Patent: Sep. 10, 2013

(54) SUPPORT APPARATUS AND METHOD FOR SIMPLIFYING DESIGN PARAMETERS DURING A SIMULATION PROCESS

(75) Inventors: Hirokazu Anai, Kawasaki (JP); Hidenao Iwane, Kawasaki (JP); Hitoshi Yanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 12/702,425

(22) Filed: Feb. 9, 2010

(65) Prior Publication Data

US 2010/0205574 A1 Aug. 12, 2010

(30) Foreign Application Priority Data

Feb. 12, 2009 (JP) ................................. 2009-029260
Aug. 19, 2009 (JP) ................................. 2009-190359

(51) Int. Cl.
*G06F 17/50* (2006.01)

(52) U.S. Cl.
USPC ................ 716/136; 716/111; 703/13; 703/14

(58) Field of Classification Search
USPC .......... 716/50–56, 106, 111, 136; 703/13–14
See application file for complete search history.

(56) References Cited

U.S. PATENT DOCUMENTS

| | | | | |
|---|---|---|---|---|
| 5,966,312 | A * | 10/1999 | Chen ................................ | 703/6 |
| 7,243,320 | B2 * | 7/2007 | Chiu et al. ..................... | 716/106 |
| 7,249,333 | B2 * | 7/2007 | Yu et al. ......................... | 716/106 |
| 7,630,852 | B1 * | 12/2009 | Ghanta et al. ................. | 702/117 |
| 2005/0159935 | A1 | 7/2005 | Orii et al. | |
| 2007/0042512 | A1 | 2/2007 | Kawabata | |
| 2008/0302465 | A1 | 12/2008 | Ageishi et al. | |

FOREIGN PATENT DOCUMENTS

| | | |
|---|---|---|
| JP | 6-19951 | 1/1994 |
| JP | 2000-222440 | 8/2000 |
| JP | 2000-267890 | 9/2000 |
| JP | 2001-126087 | 5/2001 |
| JP | 2003-132103 | 5/2003 |
| JP | 2003-141192 | 5/2003 |
| JP | 2005-129015 | 5/2005 |

(Continued)

OTHER PUBLICATIONS

Dolzmann et al., Real Quantifier Elimination in Practice, 1998, in B.H. Matzat, G.-M. Greuel, and G. Hiss, editor, Algorithm Algebra and Number of Theory, pp. 221-247.*

(Continued)

*Primary Examiner* — Nghia Doan
(74) *Attorney, Agent, or Firm* — Staas & Halsey LLP

(57) ABSTRACT

A design support apparatus includes: a logical expression substitution unit to substitute a part of the logical expression, which includes a function expression of the design variables and a quantifier attached to the design variable, with a substitution variable; a quantifier elimination unit to generate a relational expression including the substitution variable and design variables without the quantifier by eliminating the design variable to which the quantifier is attached from the logical expression; a sampling point generation unit to generate a plurality of sampling points corresponding to the design variables and the substitution variable included in the relational expression; a possible range computation unit to compute, for each of the sampling points, a possible range that the relational expression may take, by calculating values of remaining design variables included in the relational expression based on the relational expression; and a possible range display unit to display the possible range.

2 Claims, 30 Drawing Sheets

(56) References Cited

FOREIGN PATENT DOCUMENTS

| | | |
|---|---|---|
| JP | 2005-254308 | 9/2005 |
| JP | 2005-346714 | 12/2005 |
| JP | 2007-53166 | 3/2007 |
| JP | 2008-302828 | 12/2008 |

OTHER PUBLICATIONS

Hirokazu Anai, "'Quantifier Elimination'—Algorism, Implementation, Application", J.JSSAC, vol. 10, No. 1, 2003, pp. 3-12.

Hirokazu Anai et al., "Overview of CAD and QE", Introduction to Computational Real Algebraic Geometry, Series No. 1, Nipppon-Hyoron-sha Co., Ltd., Sugaku Seminar, vol. 554, Nov. 2007, pp. 64-70.

Hirokazu Anai et al., "Optimization by QE, and its Application", Introduc-tion to Computational Real Algebraic Geometry, Series No. 2, Nipppon-Hyoron-sha Co., Ltd., Sugaku Seminar, vol. 555, Dec. 2007, pp. 75-81.

Hirokazu Anai et al., "QE Algorithm (First Half)", Introduction to Compu-tational Real Algebraic Geometry, Series No. 3, Nipppon-Hyoron-sha Co., Ltd., Sugaku Seminar, vol. 556, Jan. 2008, pp. 76-83.

Hirokazu Anai et al., "QE Algorithm (Last Half)", Introduction to Computational Real Algebraic Geometry, Series No. 4, Nipppon-Hyoron-sha Co., Ltd., Sugaku Seminar, vol. 558, Mar. 2008, pp. 79-85.

Hirokazu Anai et al., "QE by CAD", Introduction to Computational Real Algebraic Geometry, Series No. 5, Nipppon-Hyoron-sha Co., Ltd., Sugaku Seminar, vol. 559, Apr. 2008, pp. 82-89.

Hirokazu Anai et al., "Design Technology Based on Symbolic Computation", Fujitsu, vol. 60, No. 5, Sep. 2009, pp. 514-521.

Japanese Office Action mailed Apr. 23, 2013 for corresponding Japanese Application No. 2009-190359.

* cited by examiner

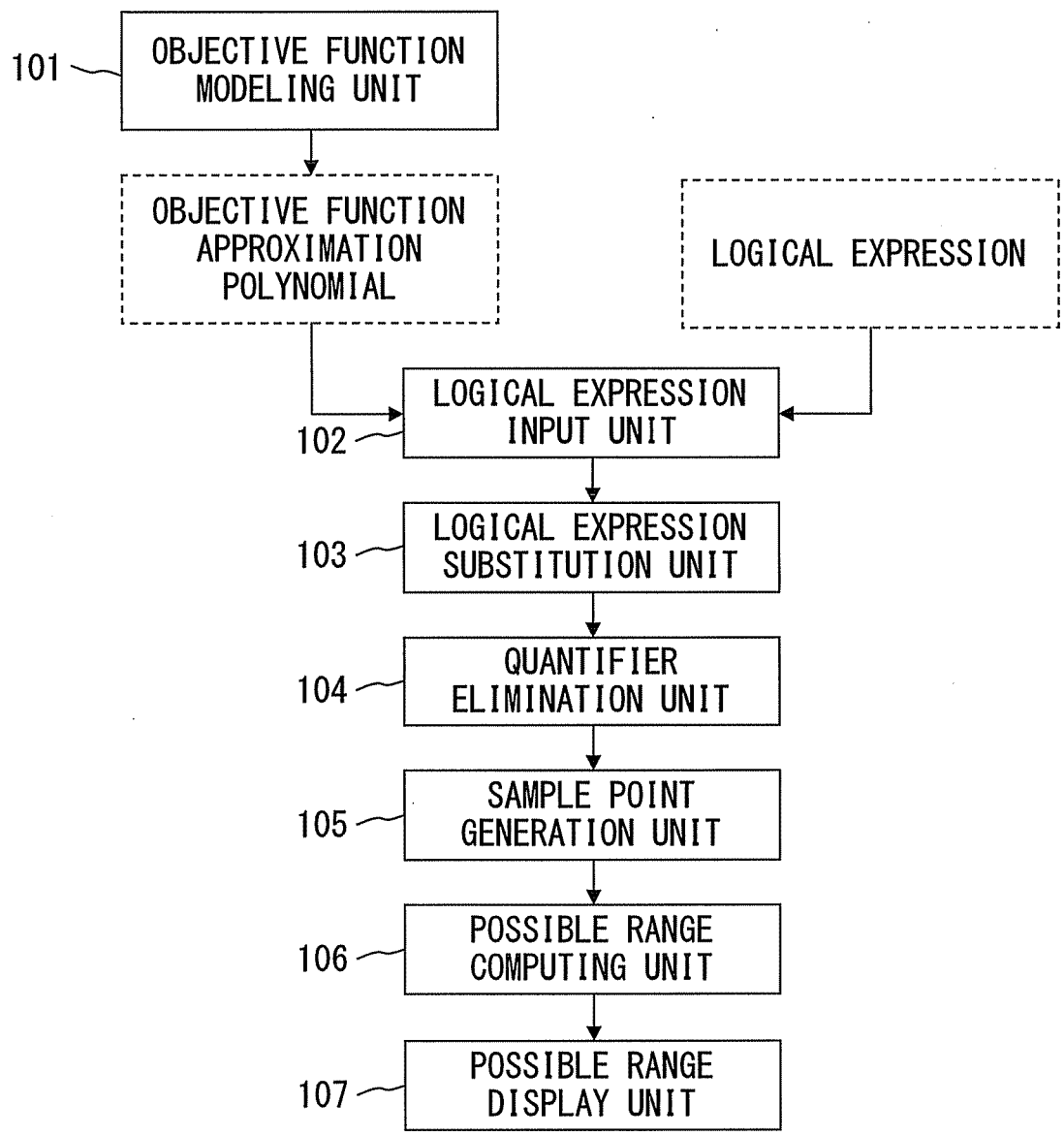
F I G. 1

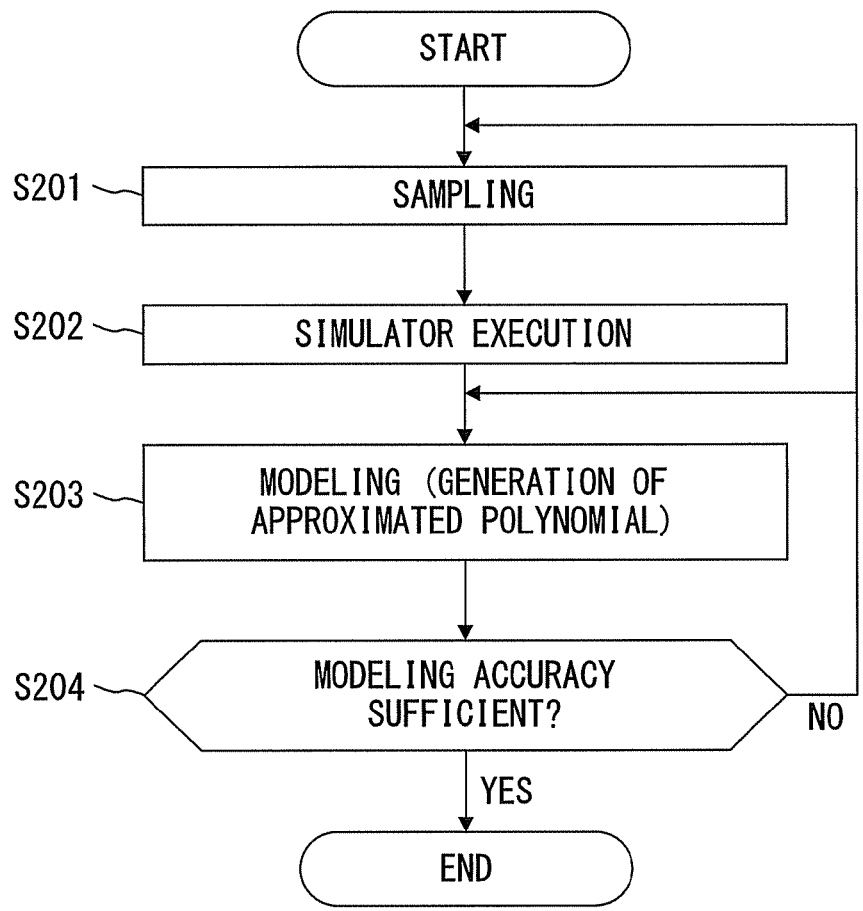
F I G. 2

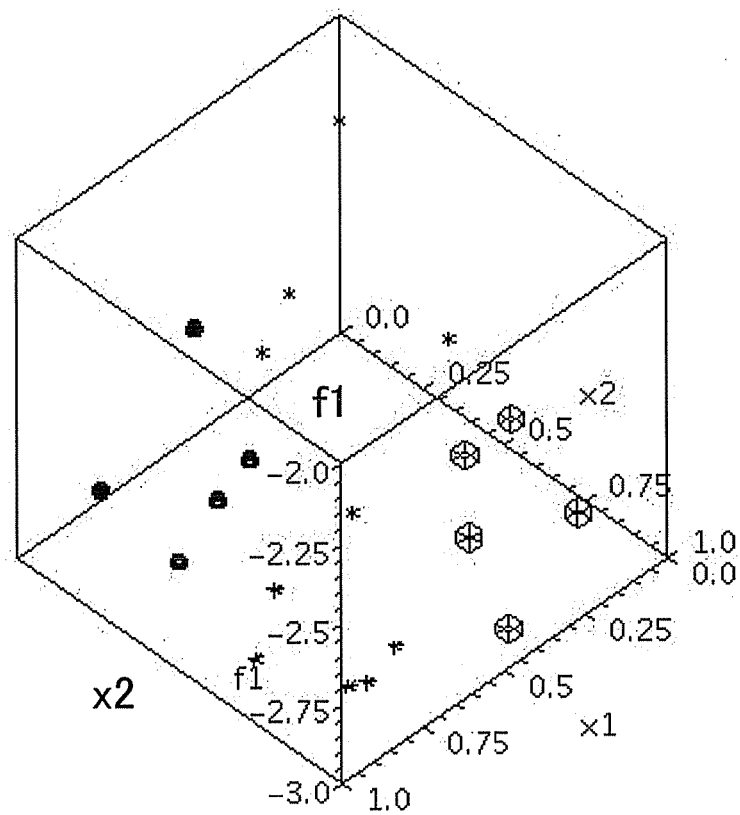
F I G. 3 A

∃x ∃y (4x − w² = 0 ∧ x − xy − z + 5 = 0 ∧ 1 ≦ x ≦ 4 ∧ 1 ≦ y ≦ 2)

401

QE

402 ~ [w − 2 ≧ 0 ∨ w + 2 ≦ 0] ∧
w + 4 ≧ 0 ∧ w − 4 ≦ 0 ∧
z − 5 ≦ 0 ∧ 4z + w^2 − 20 ≧ 0

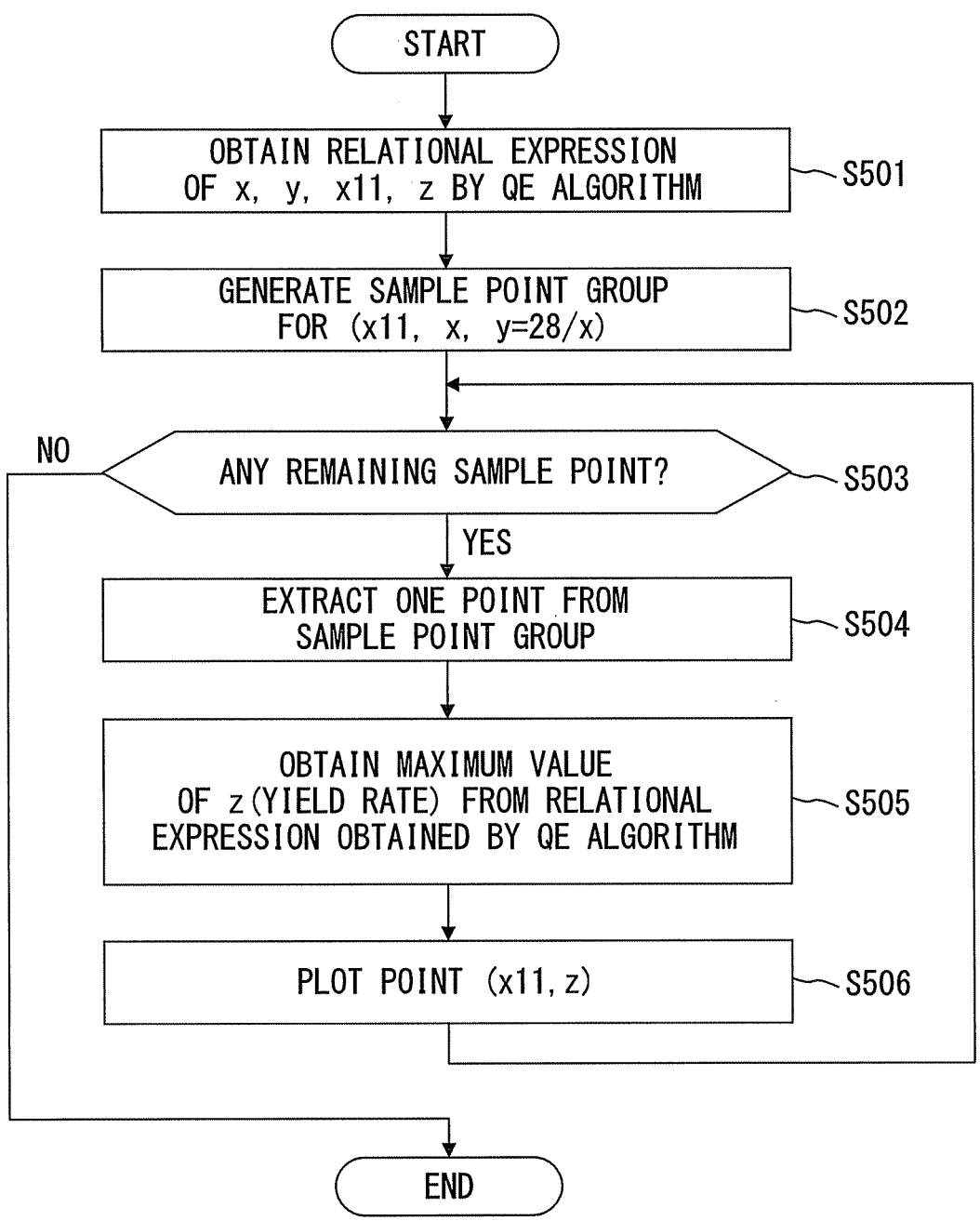
F I G. 10

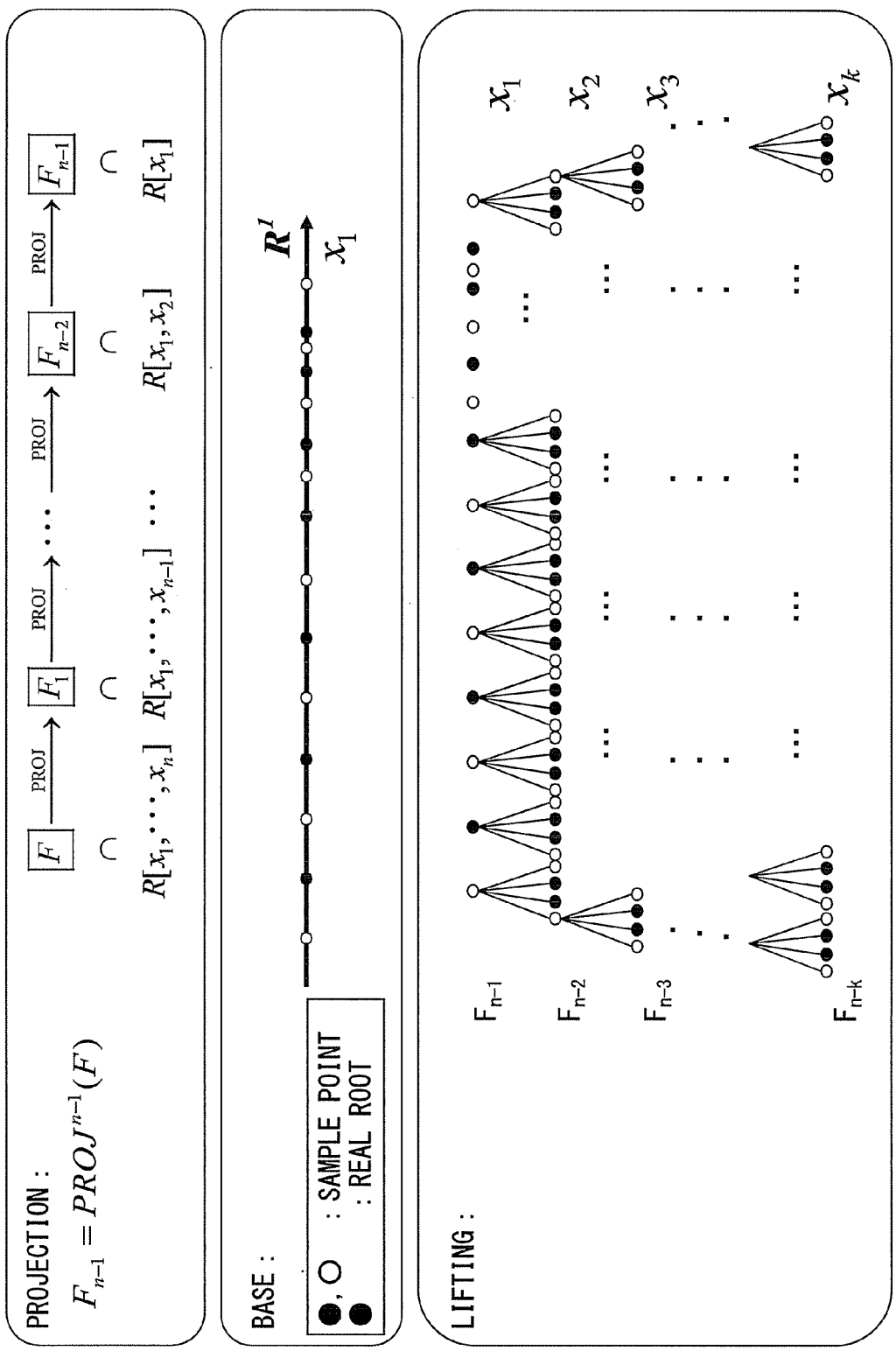
F I G. 18

$$PF = \{h_i\}, SP_1 = \{P_1,...,P_k\}, MP = \{Q_1,...,Q_L\}$$

S1901

$$SP_1 = \{P_1,...,P_L, P_{L+1},...,P_k\},$$

WHERE $P_1, \cdots, P_L$ ARE REAL ROOTS OF POLYNOMIAL OF $F_{n-1}$
AND $P_1 < \cdots < P_L$

S1902

$$D = \{D_i \mid x_{i-1} \leq x_1 \leq x_i\} \text{ for } 1 \leq i \leq L+1$$

where $x_0 = -\infty, x_{L+1} = +\infty$

S1903

CALCULATE H FOR ALL j FOR EACH $D_i$ $$H \equiv \frac{1}{M} \sum_{Q_m \in_{x_1} D_i} \{\text{distance}(h_j, Q_m)\}^2$$

$\begin{cases} \text{distance} & : \text{DISTANCE BETWEEN POINT AND CURVE} \\ Q_m \in_{x_1} D_i & : \text{MEANS THAT VALUE OF } X_1 \text{ OF } Q_m \text{ IS INCLUDED IN } D_i \\ M & : \text{NUMBER OF } Q_m \text{ THAT SATISFIES } Q_m \in_{x_1} D_i \end{cases}$

S1904

$h_j$ FOR WHICH H IS MINIMUM IS DESIRED POLYNOMIAL IN $D_i$

$\{D_i, h_i\}$

F I G. 1 9

POSSIBLE RANGE EXPRESSION
BY SECOND EMBODIMENT

POSSIBLE RANGE DISPLAY
BY FIRST EMBODIMENT

SUPPORT APPARATUS AND METHOD FOR SIMPLIFYING DESIGN PARAMETERS DURING A SIMULATION PROCESS

CROSS-REFERENCE TO RELATED APPLICATIONS

This application is based upon and claims the benefit of priority of the prior Japanese Patent Application No. 2009-029260, filed on Feb. 12, 2009, and the Japanese Patent Application No. 2009-190359, filed on Aug. 19, 2009, the entire contents of which are incorporated herein by reference.

FIELD

The present invention relates to a design support apparatus and a design support method.

BACKGROUND

In the designing stage in manufacturing, there is a need for determining optimal design parameters with respect to the design condition. For example, in the designing of an SRAM (static random access memory), as illustrated in FIG. 22 for example, the design values of the size (the area: W×L), Vth (the operation threshold of transistors included in the SRAM), leak current, power supply voltage, etc. are calculated in the initial of the designing.

In this case, when the yield rate is selected as the design condition for example, the designer performs the optimal design of the SRAM by comprehending the relation and the like of the yield rate and the size as well as other design values. Conventionally, such comprehension has often been determined by the knowledge/experience of the designer. However, as manufacturing system becomes more complicated, there has been a need for techniques to support the optimal design.

In the conventional design support techniques in the manufacturing design, as illustrated in FIG. 23 for example, design parameters are sampled in a design parameter space (S2301). These represent a design parameter combination for calculating the size, Vth, Leak, power supply voltage and so on. Next, a sample of each parameter combination is input into a simulator that simulates the operation of the design target (SRAM, for example), and a numerical calculation is performed (step S2302). Accordingly, the numerical calculation of the design condition such as the yield rate of the design target, as well as the design values of the size, Vth, Leak, supply voltage is performed. At this time, the numerical calculation of a plurality of objective functions (cost functions) for which the input is the design parameter combination for calculating the yield rate, for example, is performed. The relation between the numerically-calculated objective functions is then plotted on a display screen and the like (step S2303). The designer decides whether or not the accuracy of the part where the plurality of objective functions become optimal at the same time (called "Pareto frontier") on the plotting screen is sufficient (step S2304). When the designer determines that the accuracy is not sufficient, the sampling is repeated further, and the numerical calculation by the simulator is performed repeatedly until the accuracy becomes sufficient.

However, in the conventional numerical calculation method as described above, when there are a large number of design parameter combinations and a large number of types of design parameters constituting each combination, if an attempt is made to search the search space thoroughly, a combinational explosion occurs, making it impossible to do the calculation within the real time.

Particularly, when the relation between a plurality of objective functions for calculating the yield rate or the relation between the objective functions and the size, Vth, Leak, power supply voltage needs to be visually recognized, conventionally, a significant amount of simulator calculation had to be done again every time a display axis (objective functions, design values, design parameters and so on) to be the comparison target is selected.

As described above, conventionally, there has been a problem that a large amount of time is required for the numerical calculation by the simulator, making it impossible to appropriately determine the accuracy of the Pareto frontier in the entire search area in the sampling, and making it difficult to realize the support for the optimal design.

For example, as illustrated in FIG. 24A-FIG. 24B, a case of calculating given objective functions f1(x1, x2) and f2(x1, x2) from design parameters x1, x2, and minimizing the values of the both objective functions at the same time is considered. In this case, in the initial stage of the designing, in the design parameter space (x1, x2) illustrated in FIG. 24A, sampling is performed evenly in the entire area, and the plotting in the objective function space (f1(x1, x2), f2(x1, x2)) illustrated in FIG. 24B is performed. At this stage, since it is difficult to predict the Pareto frontier, the sampling needs to be performed in as wide an area as possible, and the simulator calculation for that also requires a large amount of time.

Next, in the plotting in the objective function space, if the designer determines that the area 2501 in FIG. 25B is the optimal Pareto area, additional sampling is performed further around an area 2502, which is corresponding to the area 2501, in the design parameter space. In this case, the simulator calculation requires a large amount of time as well.

SUMMARY

According to an aspect of an invention, a design support apparatus that displays a relation between design variables including a design parameter or a design condition, includes: a logical expression input unit configured to input a logical expression expressing a design specification and including a function expression of the design variables and a quantifier attached to the design variable; a logical expression substitution unit configured to substitute a part of the logical expression with a substitution variable; a quantifier elimination unit configured to generate a relational expression including the substitution variable and design variables without the quantifier by eliminating the design variable to which the quantifier is attached from the logical expression obtained by the substitution; a sampling point generation unit configured to generate a plurality of sampling points corresponding to the design variables and the substitution variable included in the relational expression; a possible range computation unit configured to compute, for each of the sampling points, a possible range that the relational expression may take, by calculating values of remaining design variables included in the relational expression based on the relational expression; and a possible range display unit configured to display the possible range.

According to another aspect of an invention, a design support apparatus that provides a relation between design variables including a design parameter or a design condition, comprising: a logical expression input unit configured to input a logical expression expressing a design specification and including a function expression of the design variables and a quantifier attached to the design variable; a quantifier elimination unit configured to generate a relational expression including the design variables without the quantifier by eliminating the design variable to which the quantifier is attached from the logical expression; a sampling point generation unit configured to generate a plurality of sampling points corresponding to the design variables included in the relational expression; a possible range computation unit configured to compute, for each of the sampling points, a possible range that the relational expression may take, by calculating values of remaining design variables included in the relational expression based on the relational expression; a maximum value set extraction unit configured to extract a set of maximum values from the possible range as a maximum value set; and a maximum value polynomial group computing unit configured to input, as a projection factor polynomial set, polynomials of a projection factor computed in a process in which the quantifier elimination unit eliminate the design variable to which the quantifier is attached, and to output a polynomial group that most appropriately represents the maximum value set as a maximum value polynomial group, by matching the maximum value set with each polynomial in the projection factor polynomial set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram of the first embodiment of a design support apparatus.

FIG. 3A and FIG. 3B describe an objective function approximation polynomial.

FIG. 10 is a detail flowchart that describes the operation in FIG. 5 for an operation example 4.

FIG. 18 is a diagram illustrating the operation in the CAD process in the quantifier elimination unit.

FIG. 19 is an operation flowchart of a maximum value polynomial group computing unit.

FIG. 23 is a flowchart illustrating conventional design support operations.

DESCRIPTION OF EMBODIMENTS

Figure 3B:
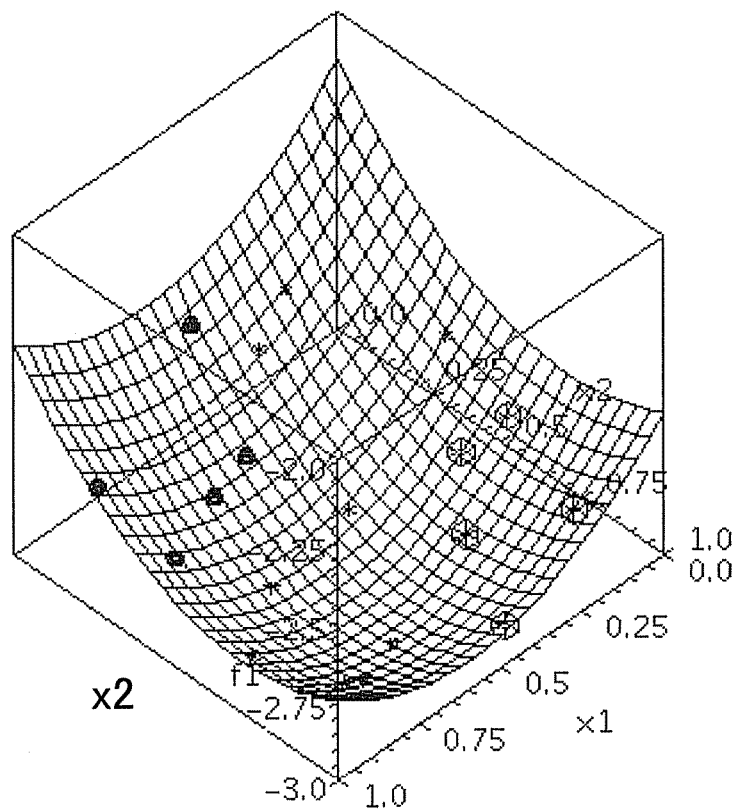

FIG. 1 is a configuration diagram of the first embodiment of the design support apparatus.

A logical expression input unit 102 inputs a logical expression expressing a design specification and including a function expression of the design variables and a quantifier attached to the design variable. The design variables includes at least a design parameter and a design condition. The logical expression input unit 102 may also input a logic symbol linking the design variables and the relational expression.

An objective function modeling unit 101 inputs a plurality of combinations of design parameter group samples including a plurality of the design parameters, calculates a value of a given objective function corresponding to each of the combinations, and computes an objective function polynomial approximation in which the objective function is approximated by a polynomial including the design parameters, based on the calculated value of each objective function and the design parameter group samples.

Then, the logical expression input unit 102 inputs the objective function approximation polynomial calculated by the objective function modeling unit 101 as a part of the logical expression.

A logical expression substitution unit 103 substitutes a part of the logical expression input by the logical expression input unit 102 with a substitution variable. A quantifier elimination unit 104 eliminates a design variable to which a quantifier is attached from the logical expression obtained by the substitution by the logical expression substitution unit 103, in accordance with the QE method (to be described later), to generate a relational expression including the substitution variable and the design variables without a quantifier.

A sampling point generation unit 105 generates a plurality of sampling points corresponding to the design variables and the substitution variable included in the relational expression.

A possible range computation unit 106 calculates, for each sample point mentioned above, the values of the remaining design variables included in the relational expression based on the expression generated by the quantifier elimination unit 104, to compute a possible range of the relational expression. A possible range display unit 107 displays the possible range computed by the possible range computation unit 106.

The operation of the first embodiment configured as described above is explained below.

For example, it is assumed that the designer selects the yield rate as the design condition and wants to find the parameters that would make the yield rate as high as possible. In designing an SRAM and the like, usually, a plurality of objective functions are calculated for calculating the yield rate. It is assumed here that the objective functions are called SNM and WM for example, and that the yield rate is defined as the smaller value of the objective function values. That is, $$\text{yield rate}=\min(SNM, WM) \quad (1)$$

where the objective functions SNM and WM may usually be numerically calculated by a simulator using specified plurality of types of design parameter groups. Therefore, generally, the numerical calculation of expression (1) mentioned above is performed with respect to various parameter groups, and the objective of the designing may be attained by recognizing the maximum value of the calculation results. This process is a multi-objective optimization process to optimize a plurality of objective functions at the same time.

However, the objective functions SNM and WM for an SRAM and the like generally involve complicated functional calculations to which a number of types of design parameter groups are input. Therefore, if the numerical calculation of the expression (1) is performed while changing the value of each design parameter from 0 to 1 for example, a tremendous amount of calculation is required to compute the combination of the optimal design parameter groups to maximize the yield rate, making it virtually difficult to realize the optimization within the real time.

Figure 2:
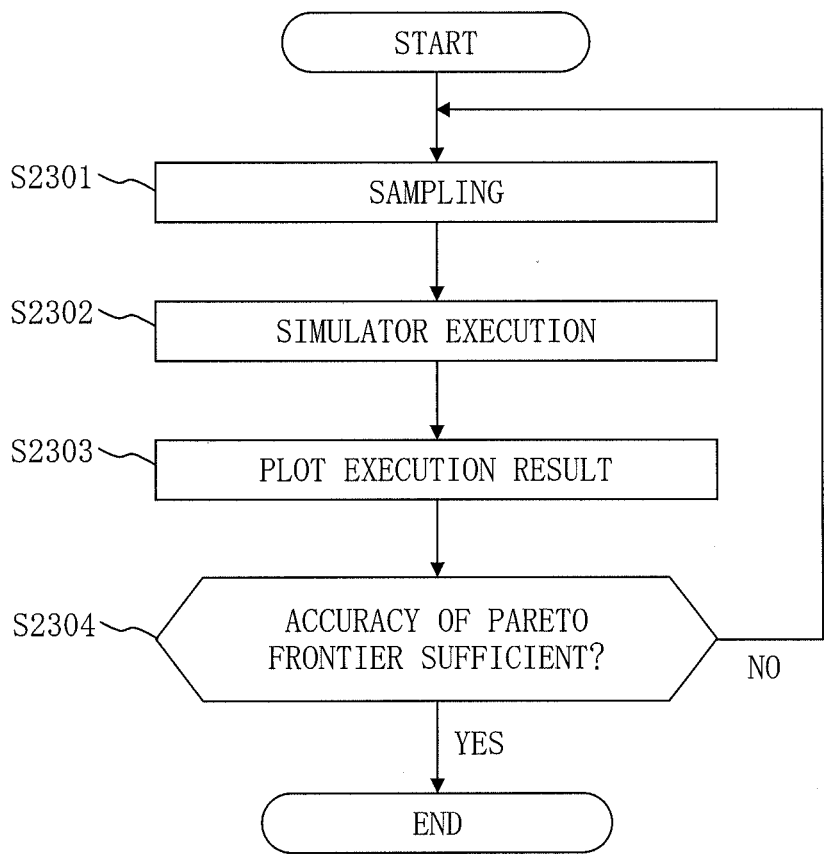
FIG. 2 is a flowchart illustrating the operation of an objective function modeling unit.
Figures 24A, 24B:
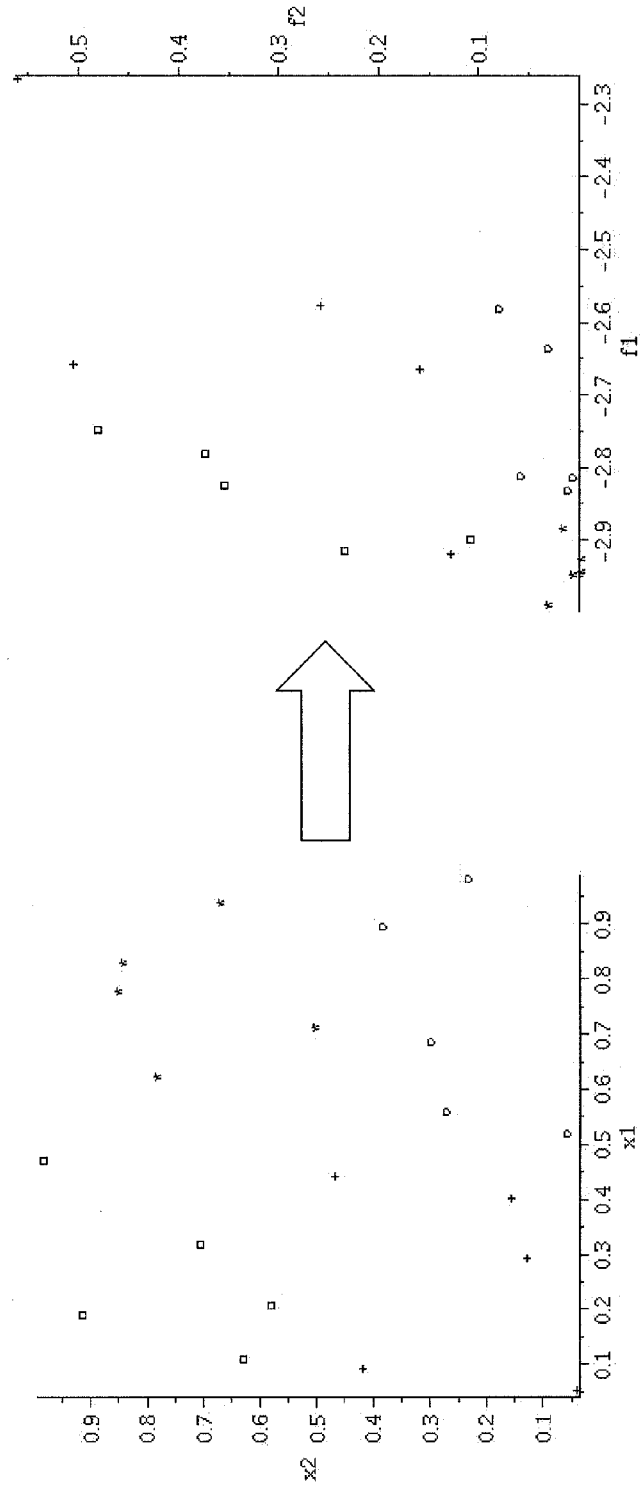
FIGS. 24A, 24B, 25A, and 25B are diagrams illustrating a problem of conventional arts.
Figures 25A, 25B:
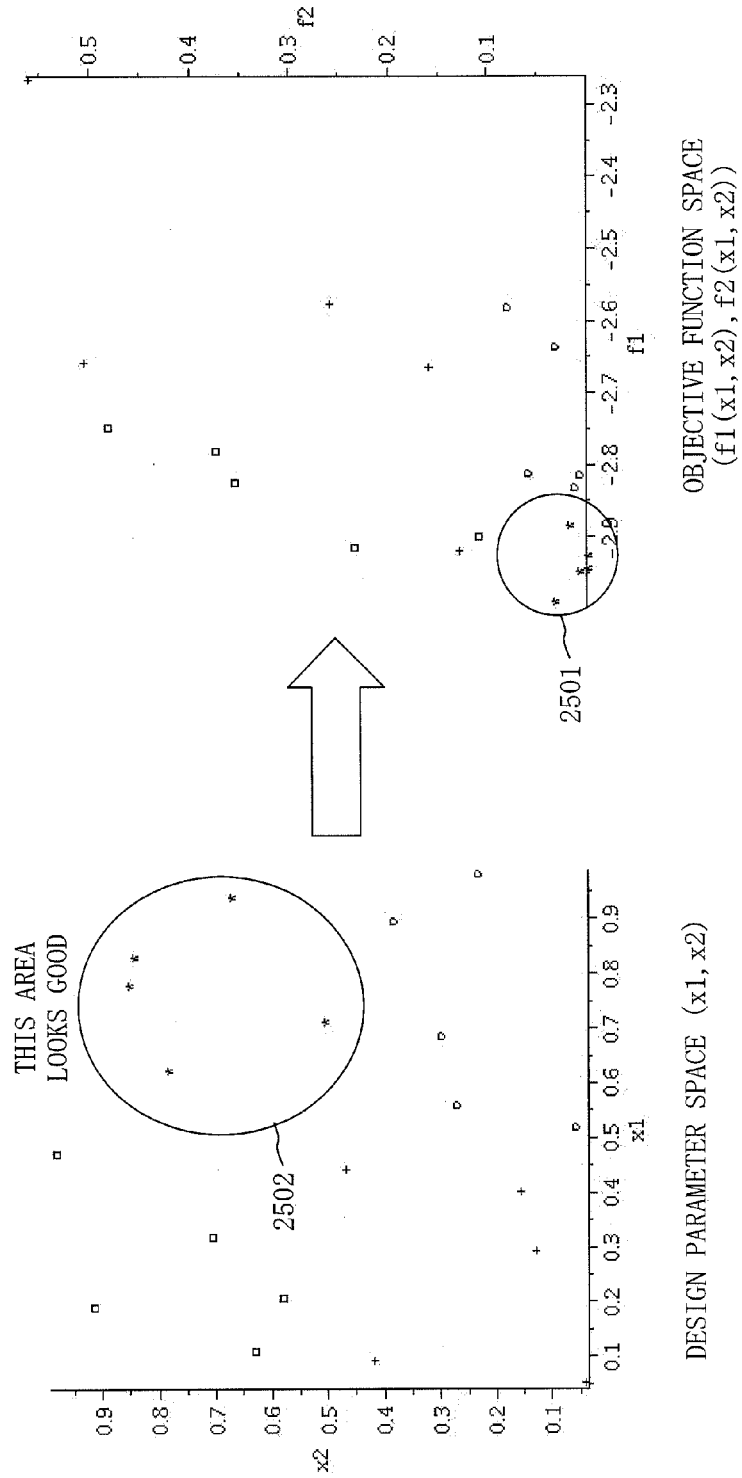

Therefore, according to the first embodiment, the objective function modeling unit 101 performs an objective function modeling process illustrated in the flowchart in FIG. 2, to compute an objective function approximation polynomial.

The objective function modeling unit 101 samples a plurality of combinations of design parameter groups including a plurality of types of design parameters (step S201). The number of sample combinations does not need to be significantly large.

Next, the objective function modeling unit 101 makes a simulator that is not particularly illustrated in the drawing execute a simulator calculation for the sample combination, to numerically calculate the value of each of the objective functions SNM and WM corresponding to each sample combinations (step S202). While each numerical calculation of the objective functions SNM and WM for the design parameter group of one sample takes about 2 to 3 minutes, the calculation process is not a difficult process, since the number of sample combinations is not significantly large.

Then, the objective function modeling unit 101 performs an approximation process using the least-squares method for example, for a plurality of sample combinations consisting of a pair of each value of the objective functions SNM and WM and a design parameter group, to compute each objective function approximation polynomial in which each of the objective functions SNM and WM is approximated by a polynomial including the design parameters (step S203).

The objective function modeling unit 101 decides whether or not the accuracy of the modeling is sufficient, for each of the objective function approximation polynomial calculated for the objective functions SNM and WM (step S204). In a case of applying the least-squares method, a degree-of-freedom corrected coefficient of determination and the like is used as an index of accuracy. The objective function modeling unit 101 decides whether or not the value of the degree-of-freedom corrected coefficient of determination has become 0.9 or above for example, to decide the accuracy of the modeling (step S204)

When the objective function modeling unit 101 decides that the accuracy of the modeling is not sufficient in step S204, for example, the modeling process in step S203 or the sampling in step S201 is performed again, to repeat the modeling process. When the objective function modeling unit 101 decides that the accuracy of the modeling is sufficient in step S204, each objective function approximation polynomial computed for the objective functions SWM and WM is output, and the modeling process is terminated.

By the process performed by the objective function modeling unit 101 described above, an objective function approximation polynomial is obtained as illustrated as the following expression.

$$\begin{aligned}SNM=&-3.70880619227755703-\\&1.815535443549214242e\text{-}2*x1+\\&0.362756928799239723e\text{-}1*x2+\\&0.529879430721035828e\text{-}1*x3-\\&0.186187407180227748e\text{-}1*x4+\\&0.378882808207316458e\text{-}1*x5+\\&0.577218911880007530e\text{-}2*x6+\\&15.4475497344388622*x7+\\&7.61316609791377275*x8+\\&11.1015094199909559*x9+\\&11.1015094199909399*x10-\\&1.84551068765900172*x11\end{aligned} \quad (2)$$

Generally, SNM and WM may be expressed as the following expressions. In the following expressions, f1 and f2 are respectively a function of a polynominal regarding design parameters x1, . . . , x11 for example.

$$SNM=f1(x1,\ldots,x11)$$

$$WM=f2(x1,\ldots,x11) \quad (3)$$

As described above, according to the first embodiment, an objective function approximation polynomial having practical approximation accuracy may be obtained using a small number of sample combinations of design parameter groups. According to the modeling as described above, as illustrated in FIG. 3A and FIG. 3B, by just selecting sample values of a small number of design parameter groups as illustrated by the plotting in FIG. 3A on a design parameter space (x1, x2) for example, the areas other than the sample values may be approximated very smoothly by the objective function approximation polynomial computed by the objective function modeling unit 101 for the sample values as illustrated in FIG. 3B, with the objective function approximation polynomial having sufficient accuracy for the practical use.

In the first embodiment, to the objective function approximation polynomial generated as described above, a logical expression generated by attaching a constraint and a quantifier to the design parameters included in the polynomial is input by the logical expression input unit 102.

Subsequently to the above, the quantifier elimination unit 104, the sampling point generation unit 105, the possible range computation unit 106 and the possible range display unit 107 in FIG. 1 perform a control operation illustrated in the flowchart in FIG. 5.

As the basic operation, the quantifier elimination unit 104 eliminates a design parameter (=design variable) to which a quantifier is attached, from the logical expression, to generate a relational expression that includes only a design variable corresponding to the display coordinate axis (hereinafter, simply referred to as the "axis") to which no quantifier is attached (step S501 in FIG. 5). The operation of the logical expression substitution unit 103 is to be described later.

As an operation example 1 of the design support apparatus in FIG. 1, it is assumed that the designer wants to find the maximum value of the yield rate using the objective function approximation polynomials SNM and WM expressed in the expression (3). In this case, a constraint is set as follows according to the expressions (1) and (3) mentioned above.

$$SNM=f1(x1,\ldots,x11)$$

$$WM=f2(x1,\ldots,x11)$$

$$\text{yield rate}=\min(SNM,WM)$$

$$0<xi<1(I=1,2,\ldots,11)$$

The constraint mentioned above is represented as the following logical expression.

$$\text{ex}(\{x1,x2,x3,x4,x5,x6,x7,x8,x9,x10,x11\},(0<x1<1) \text{ and} \\ (0<x2<1) \text{ and } (0<x3<1) \text{ and } (0<x4<1) \text{ and} \\ (0<x5<1) \text{ and } (0<x6<1) \text{ and } (0<x7<1) \text{ and} \\ (0<x8<1) \text{ and } (0<x9<1) \text{ and } (0<x10<1) \text{ and} \\ (0<x11<1) \text{ and } SNM>z \text{ and } WM>z); \quad (4)$$

Here, "ex" means "exists" and indicates that existential quantifiers are attached to the design parameters (=design variables) x1-x11. That is,
∃x1, ∃x2, ∃x3, ∃x4, ∃x5, ∃x6, ∃x7, ∃x8, ∃x9, ∃x10, ∃x11 are set in the expression (4) above. In addition, the expression (4) indicates that each design parameter xi may take a value larger than 0 and smaller than 1. Further, in the expression (4), SNM and WM are design variables that are equivalent to SNM and WM in the expression (3) and are polynomial representation of x1-x11, and z is a design variable representing the yield rate.

The quantifier elimination unit 104 in FIG. 1 performs a process to eliminate design variables (=design parameter) x1-x11 to which a quantifier is attached, from the logical expression of (4) using the QE (Quantifier Elimination) method, for example. Regarding the details of the QE method, related-art document 1 (H. Anai and K. Yokoyama, Keisan jitsudaisū kika nyumon: CAD to QE no gaiyou [Introduction to computational real algebraic geometry: an outline of CAD and QE], Nippon Hyouronsha, Sugaku semina [Mathematics Seminar] Vol. 554 (November-2007 issue), pp. 64-70.) written by the inventors of the present application discloses the outline of the processing method, and the processing method is used without change in the first embodiment.

Figure 4:
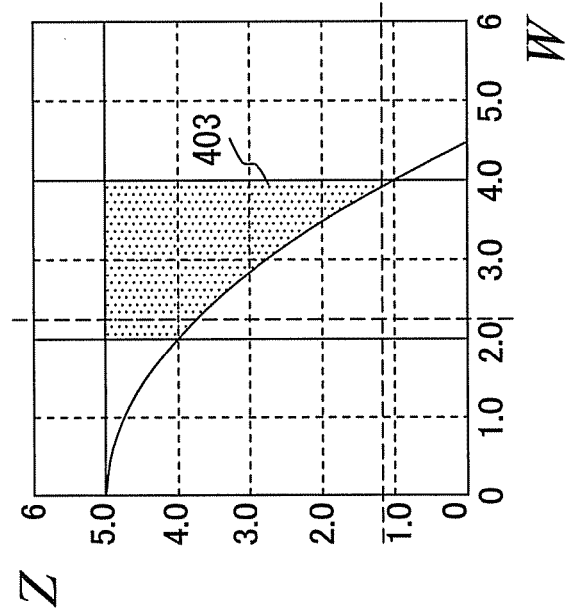
FIG. 4 is a diagram describing the QE method.

FIG. 4 describes the QE method. A logical expression 401 is an expression regarding variables x, y, w, z, and existential quantifiers are set for the variables x, y. The logical expression 401 means that "there exist variables x, y with which the relational expression represented as 401 is realized". By the application of the QE method to the logical expression 401, the variables x, y to which the quantifiers are attached are eliminated, and a relational expression 402 including only the variables w, z is computed. As a result, the relation between w and z is plotted as a possible range 403.

As a result of the application of the QE method to the expression (4) above, the relation that represents the range of z is obtained. As a result, the designer can estimate the maximum value of z easily.

As an operation example 2 of the design support apparatus in FIG. 1, it is assumed that the designer wants to find the relation between the yield rate and a particular design parameter x1 using the objective function approximation polynomials SNM and WM represented by the expression (3).

A logical expression described below is set in this case. Here, only the design parameter x1 has no existential quantifier.

$$\text{ex}(\{x2,x3,x4,x5,x6,x7,x8,x9,x10,x11\},(0<x1<1) \text{ and} \\ (0<x2<1) \text{ and } (0<x3<1) \text{ and } (0<x4<1) \text{ and} \\ (0<x5<1) \text{ and } (0<x6<1) \text{ and } (0<x7<1) \text{ and}$$

$$(0<x8<1) \text{ and } (0<x9<1) \text{ and } (0<x10<1) \text{ and} \\ (0<x11<1) \text{ and } SNM>z \text{ and } WM>z); \quad (5)$$

The quantifier elimination unit 104 performs a process to eliminate the design variables (=design parameters) x2-x11 to which a quantifier is attached, from the logical expression of (5) using the QE (Quantifier Elimination) method. As a result, a relational expression consisting of only the design parameter x1 and the yield rate z is obtained.

After the relational expression of the particular design variable is obtained by the quantifier elimination unit 104 as described above, in the case of the operation example 2 for example, the sampling point generation unit 105 performs an operation as follows. The sampling point generation unit 105 generates, in the relational expression generated by the quantifier elimination unit 104, a sample point group (0<x1<1) for a design variable remaining in the relational expression, namely, the design parameter x1 for example (step S502 in FIG. 5).

Figure 5:
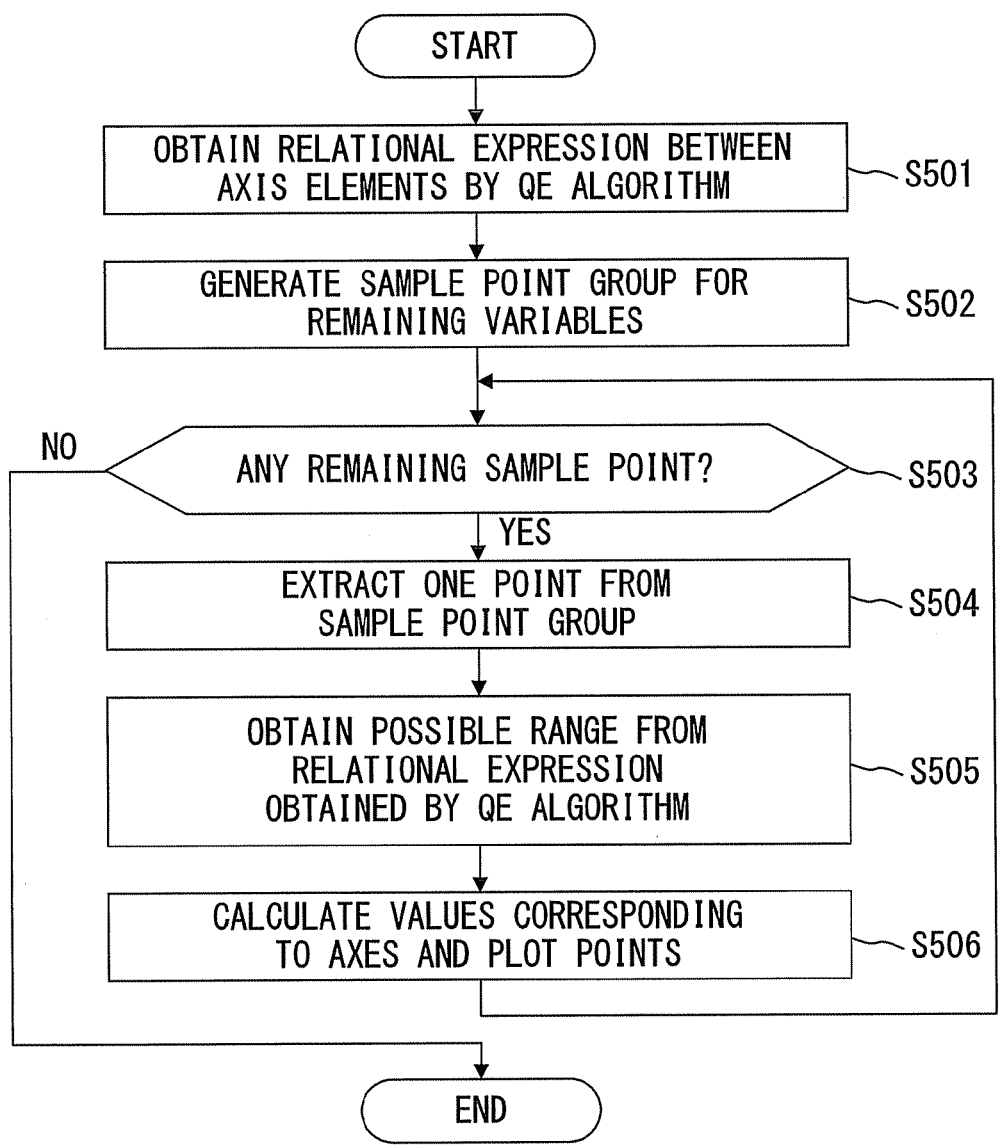
FIG. 5 is a flowchart illustrating the operations of a quantifier elimination unit, a sampling point generation unit, a possible range computing unit and a possible range display unit.

The possible range computation unit 106 decides whether or not there is any unprocessed sampling point in the sampling point group generated in step S502 (step S503 in FIG. 5). When the decision in step S503 is YES, the possible range computation unit 106 extracts one point from the sampling point group generated in step S502 (step S504 in FIG. 5). Then the possible range computation unit 106 executes the calculation of the relational expression generated by the quantifier elimination unit 104, for the sampling point, to compute the value that the yield rate z may take, that is, the possible range of z (step S505 in FIG. 5).

The possible range of z is plotted by the possible range display unit 107 by plotting on the two-dimensional coordinates having x1 and z as the axes respectively, according to the sampling points and the values of z corresponding to the sample points (step S506 in FIG. 5).

As described above, the designer can easily estimate the relation between the design parameter x1 and the yield z. Meanwhile, in the case of the operation example 1, no special plotting process needs to be performed, since only the relational expression simply representing the range of z is obtained.

In the first embodiment of the design support apparatus in FIG. 1, in addition to the basic operation described above, when the design target is an SRAM (static random access memory) for example, the logical expression input by the logical expression unit 102 may also include, functions and the like for calculating the design values of the size (area), Vth, leak current, power supply voltage and so on, other than the objective function approximation polynomial generated by the objective function modeling unit 101.

The size is expressed by a function as following expression, for example.

$$\text{Size}=(1+2*x4+3*x5)*(6+x2+x3) \quad (6)$$

Figure 22:
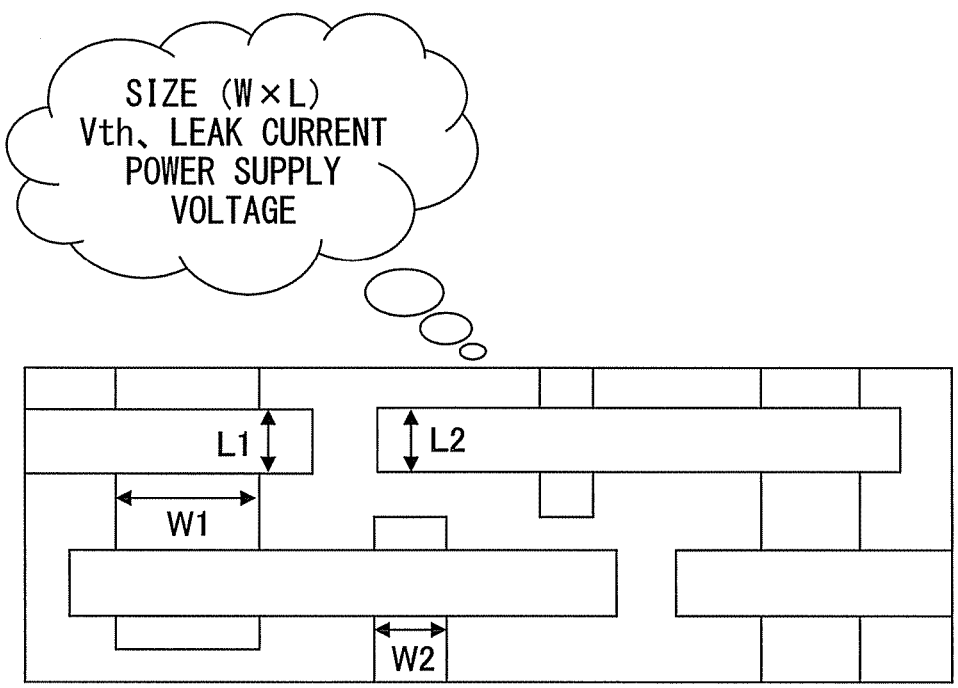
FIG. 22 is a diagram describing SRAM designing.

Here, the design parameters such as x2, x3, x4, x5 correspond to the widths W1, W2 ... and the lengths L1, L2 ... etc, that represent the size illustrated in FIG. 22.

Vth is represented as the following expression using a polynomial function f3.

$$V\text{th}=f3(x1,x4,x7) \quad (7)$$

The leak current Leak is represented as the following expression using an exponential function f4, for example, $$\text{Leak}=f4(x1,x4,x7)$$

In the expression (7) and the expression (8), x1, x4, x7 etc., are specified design parameters.

In this case, the designer may want to find, not only the relation between the yield rate and the design parameters simply, but also the relation of the yield rate and the size, the relation of the yield rate, size and Vth, or, the relation of the yield rate, size and leak current.

For example, as an operation example 3 of the design support apparatus in FIG. 1, when the designer wants to find the relation between the yield rate and the size, a constraint is set as follows based on the expression (1), the expression (3) and the expression (6) described above.

$$SNM = f1(x1, \ldots, x11)$$

$$WM = f2(x1, \ldots, x11)$$

yield rate = min($SNM, WM$)

$$0 < xi < 1 (i=1,2,\ldots,11)$$

size = $(6+x2+x3)*(1+2*x4+3*x5)$

The constraint is represented as a logical expression as follows.

ex({$x1,x2,x3,x4,x5,x6,x7,x8,x9,x10,x11$},(0<$x1$<1) and
 (0<$x2$<1) and (0<$x3$<1) and (0<$x4$<1) and
 (0<$x5$<1) and (0<$x6$<1) and (0<$x7$<1) and
 (0<$x8$<1) and (0<$x9$<1) and (0<$x10$<1) and
 (0<$x11$<1) and (1+2*$x4$+3*$x5$)*(6+$x2$+$x3$)=size
 and $SNM$>$z$ and $WM$>$z$);                         (9)

With the logical expression, a case of making an attempt in step S501 in FIG. 5 executed by the quantifier elimination unit 104 to perform a process to eliminate the design variables (=design parameters) x1-x11 to which the quantifiers are attached, from the logical expression (9) above, using the QE method is considered. In this case, since the function representing the size in (9) is a quadratic expression of the design parameters, the calculation amount in the QE method increases, and the process by the quantifier elimination unit 104 may not be completed within the real time.

Thus, in such a case, prior to the execution of the quantifier elimination unit 104, the logical expression substitution unit 103 operates first. The logical expression substitution unit 103 extracts a relational-expression part having a high degree, from the logical expression (9) input by the logical expression input unit 102 for example. The logical expression substitution unit 103 then factorizes the extracted part. Accordingly, the logical expression substitution unit 103 divides the relational expression having a high decree into a plurality of factors that are expressed by a primary expression of the design parameters, and newly assigns design variables x, y, etc. to each factor. That is, the logical expression substitution unit 103 performs the substitution of the logical expression (9) into a form as illustrated as an expression (10) below.

ex({$x1,x2,x3,x4,x5,x6,x7,x8,x9,x10,x11$},(0<$x1$<1) and
 (0<$x2$<1) and (0<$x3$<1) and (0<$x4$<1) and
 (0<$x5$<1) and (0<$x6$<1) and (0<$x7$<1) and
 (0<$x8$<1) and (0<$x9$<1) and (0<$x10$<1) and
 (0<$x11$<1) and (1+2*$x4$+3*$x5$)=$x$ and (6+$x$
 2+$x3$)=$y$ and $SNM$>$z$ and $WM$>$z$);           (10)

Figure 6:
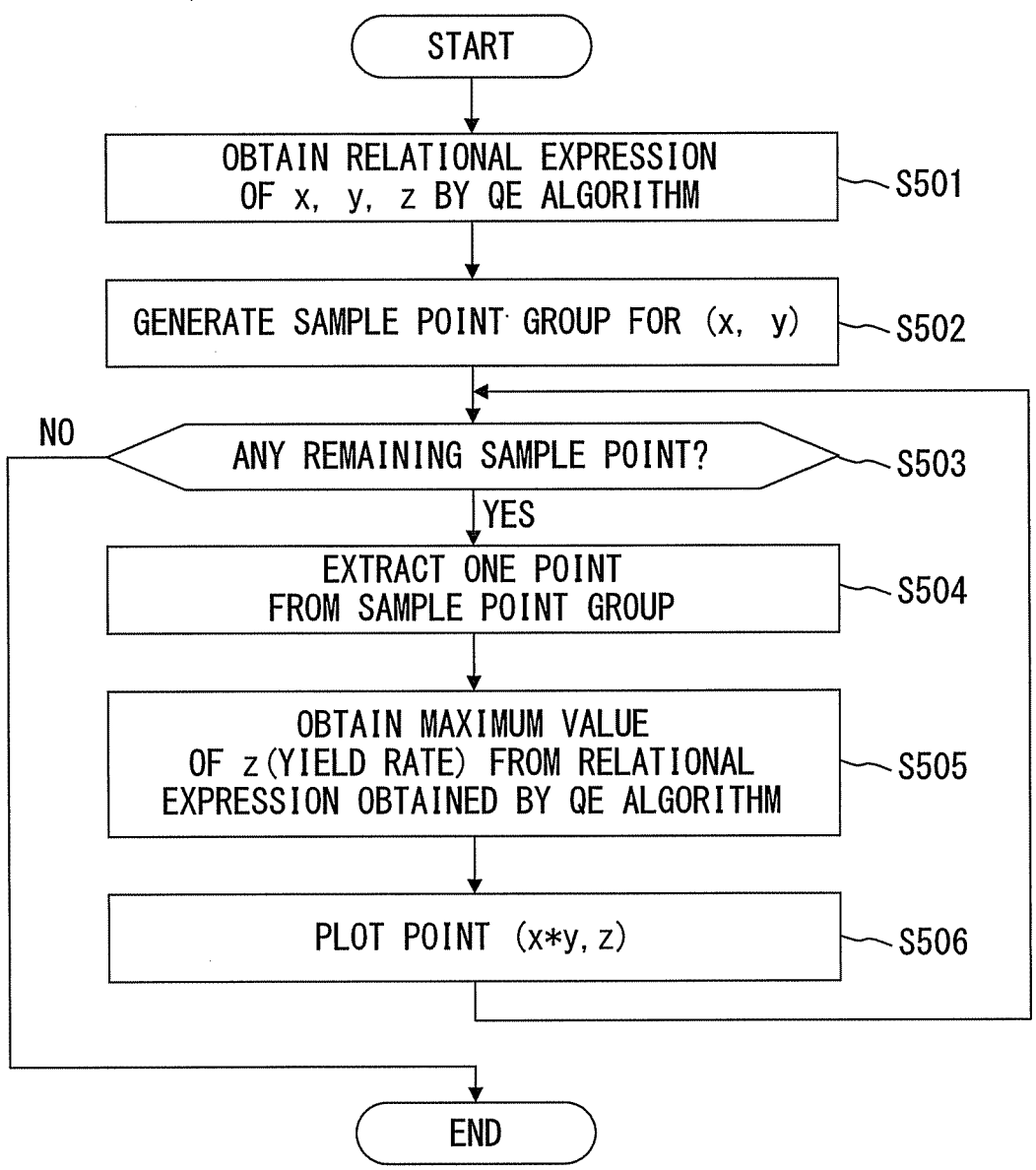
FIG. 6 is a detail flowchart that describes the operation in FIG. 5 for an operation example 3.

The quantifier elimination unit 104 performs the process of the QE method described above, to the logical expression as represented in the expression (10) output from the logical expression substitution unit 103 as a result of the substitution process described above. FIG. 6 is a detail flowchart that describes the operation in FIG. 5 for the operation example 3. In FIG. 6, the same step numbers are assigned to the same steps as those in FIG. 5.

The logical expression substitution unit 103 calculates a relational expression that includes only x, y, z as the design variables, by applying the QE method to the expression (10) (step S501 in FIG. 6). In this case, since the expression (10) does not include a high-degree term for the design parameters, the quantifier elimination unit 104 carries out the QE method at a high speed.

After that, the sampling point generation unit 105 generates a sample group (0<x1<1) of the design variables x, y remaining in the relational expression generated by the quantifier elimination unit 104 (step S502 in FIG. 6). Here, if the objective is to reduce the size of the design target, in order to increase the plot accuracy at the points for smaller sizes, more points with a small value of x, y may be selected.

The possible range computation unit 106 decides whether or not there is any unprocessed sample point in the sampling point group generated in step S502 (step S503 in FIG. 6). When the decision in step S503 is YES, the possible range computation unit 106 extracts one point from the sampling point group generated in step S502 (step S504 in FIG. 6).

The possible range computation unit 106 executes the calculation of the relational expression generated by the quantifier elimination unit 104 for the sampling point, to compute the value that the yield rate z may take, that is, the possible range of z, and computes the maximum value of z from the possible range (step S505 in FIG. 6). The possible range display unit 107 calculates the value x*y corresponding to the size according to the sample point, and displays the relation between the size and z by plotting on the two-dimensional coordinates with x*y and z as the axes respectively according to the values of x*y and z corresponding to x*y (step S506 in FIG. 6).

As described above, in the case when a logical expression for the size including a high-degree term of a design parameter is input, by factorizing the high-degree term by the logical expression substitution unit 103, the QE method may be applied at a high speed. In this case, the value of the axis of the x*y corresponding to the size is not calculated directly from the relational expression output from the quantifier elimination unit 104, but may be calculated easily when the possible range display unit 107 performs the plotting process. Therefore, the processing efficiency does not decrease.

Figure 7:
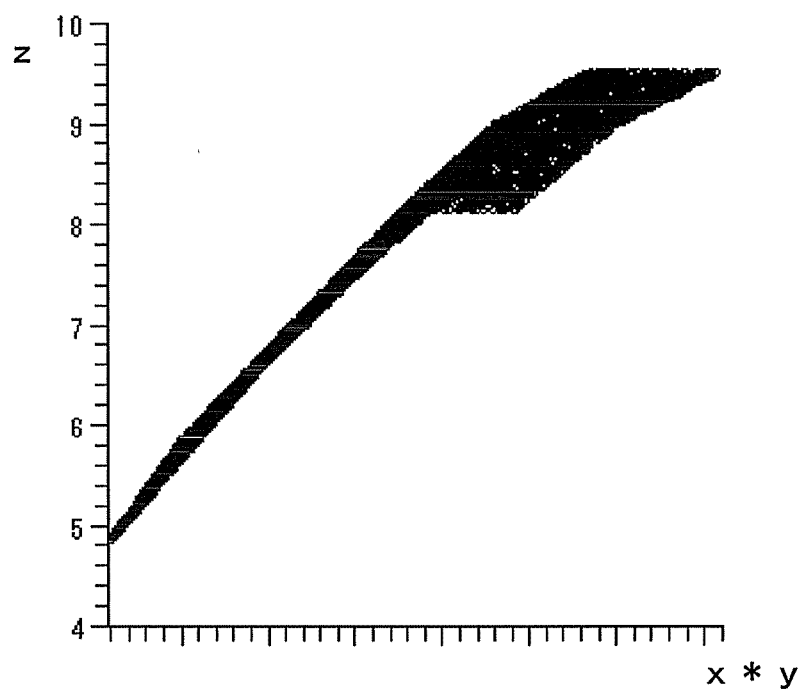
FIG. 7 is a diagram illustrating a plotting example by the possible range display unit corresponding to the operation example 3.

FIG. 7 illustrates a plotting example by the possible range display unit 107 corresponding to the operation example 3 described above, where the horizontal axis represents x*y, and the vertical axis represents the yield rate z. The sampling point group generated in step S502 in FIG. 6 includes 10000 samples. In this case, the calculation of the relational expression in step 505 in FIG. 6 may be performed at a high speed since it is calculation of a numeric expression. In FIG. 7, the area in and below the shaded area is the possible range. Since the maximum value of z varies depending on the combination of x, y for a certain size, the line has thickness. From the plotting example, the estimated maximum value of the yield rate may be intuitively understood for each size.

Figure 8A:
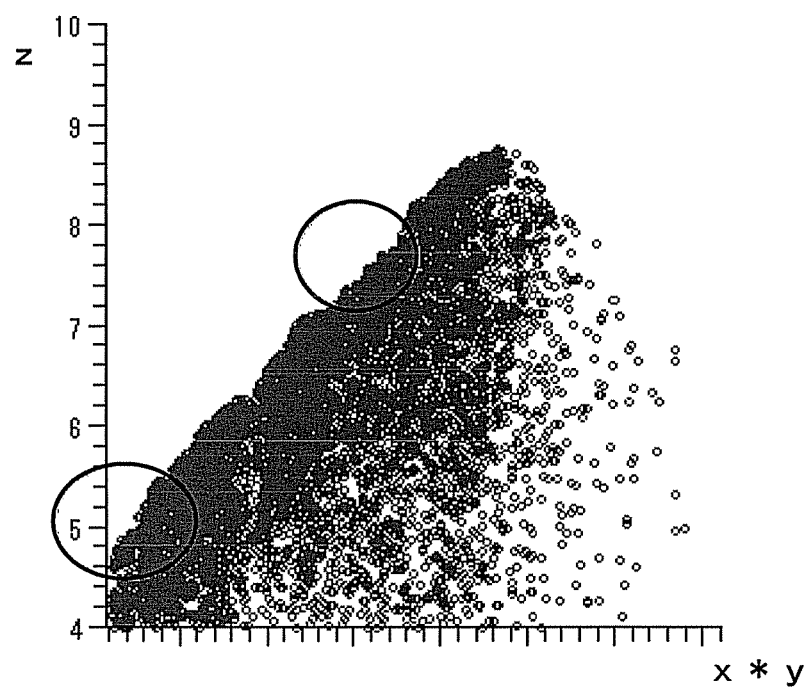
FIG. 8A and FIG. 8B illustrate comparison (1) of plotting examples by the conventional method and the embodiment corresponding to the operation example 3.
Figure 8B:
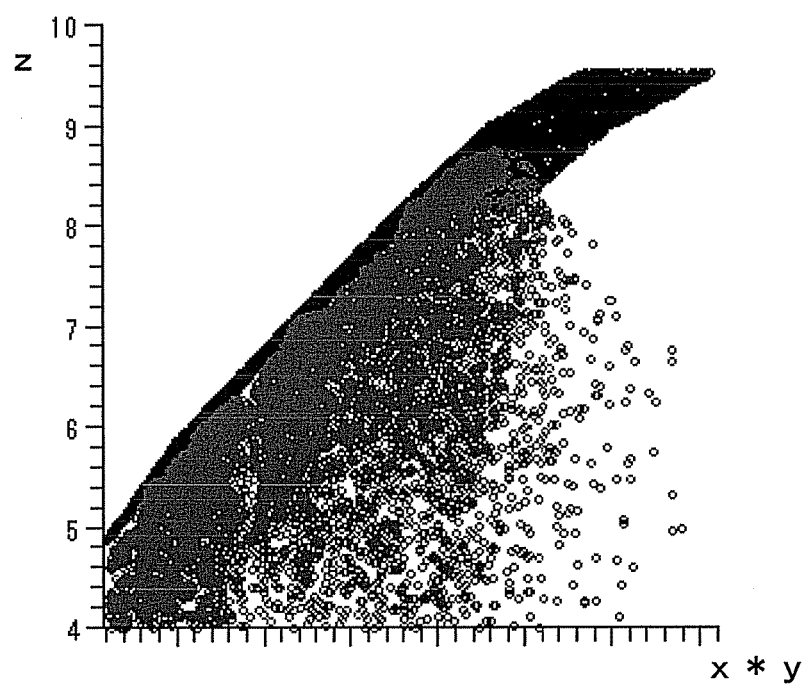

FIG. 8A illustrates a plotting example of the possible range of z for the size x*y obtained when conventional numerical calculation by a simulator is performed for the sample point group of 10000 samples. FIG. 8B illustrates a plotting example in which the plotting example by the embodiment in FIG. 7 and the plotting example in FIG. 8A by the conventional example are overlapped with each other. As is understood from these figures, in the circled areas in FIG. 8A for example, the Pareto frontier is not obtained by the calculation in the conventional example, but according to the embodiment, although the calculation process is performed at a high speed, the Pareto frontier is obtained with good accuracy.

Figure 9A:
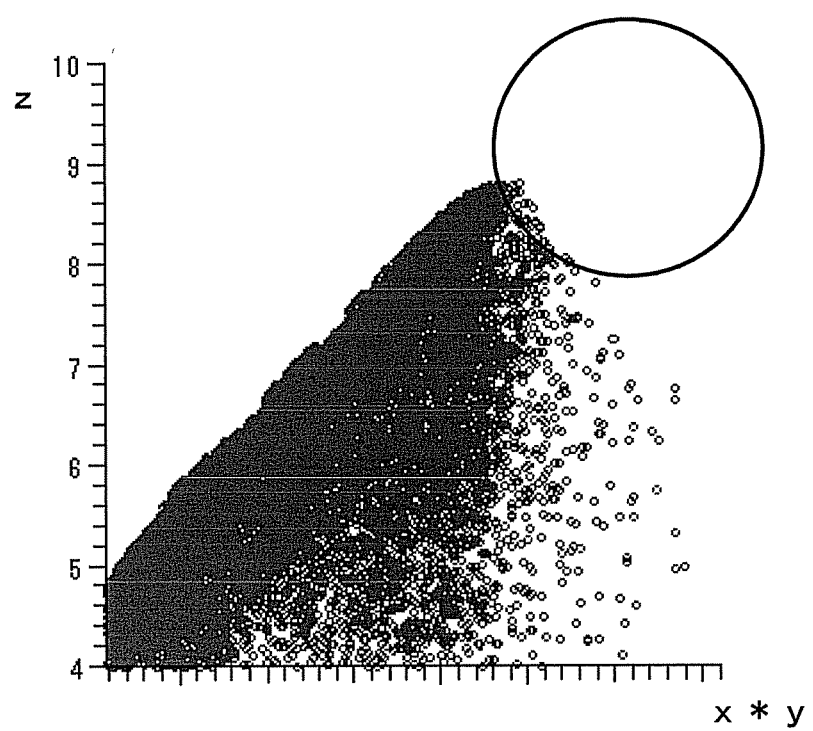
FIG. 9A and FIG. 9B illustrate comparison (2) of plotting examples by the conventional method and the embodiment corresponding to the operation example 3.
Figure 9B:
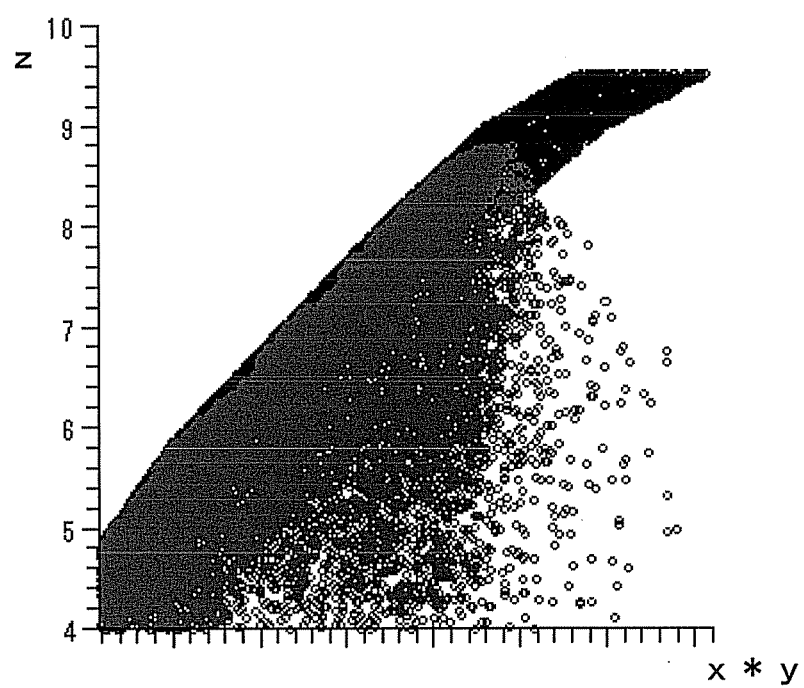

FIG. 9A illustrates a plotting example of the possible range of z for the size x*y obtained when conventional numerical calculation by a simulator is performed for the sampling point group of 20000 samples. FIG. 9B illustrates a plotting example in which a plotting example by the embodiment with 20000 samples and the plotting example in FIG. 9A by the conventional example are overlapped with each other. Since the objective is to have a small size and a large yield rate, in the conventional example, even if the number of samples in the sampling point group is increased to 20000, the plotted points are concentrated on the left side, and as illustrated with the circle in FIG. 9A, the plotting is not performed in the entire area. According to the embodiment, the plotting is performed in the entire area.

As an operation example 4 of the design support apparatus in FIG. 1, when the designer wants to find the relation between a certain design variable, for example the design parameter x11, and the yield rate for a given size, a constraint is set as follows based on the expression (1), the expression (3) and the expression (6) described above.

$$SNM = f1(x1, \ldots, x11)$$

$$WM = f2(x1, \ldots, x11)$$

$$\text{yield rate} = \min(SNM, WM)$$

$$0 < xi < 1 \, (i=1,2,\ldots,11)$$

$$\text{size} = (6+x2+x3)*(1+2*x4+3*x5) = 28$$

The logical expression obtained as a result of a substitution process performed by the logical expression substitution unit 103 for the constraint above is as follows.

$$\text{ex}(\{x1, x2, x3, x4, x5, x6, x7, x8, x9, x10\}, (0<x1<1) \text{ and } \\ (0<x2<1) \text{ and } (0<x3<1) \text{ and } (0<x4<1) \text{ and } \\ (0<x5<1) \text{ and } (0<x6<1) \text{ and } (0<x7<1) \text{ and } \\ (0<x8<1) \text{ and } (0<x9<1) \text{ and } (0<x10<1) \text{ and } \\ (0<x11<1) \text{ and } (1+2*x4+3*x5)=x \text{ and } (6+x2+x3)=y \text{ and } x*y=28 \text{ and } SNM>z \text{ and } WM>z); \quad (11)$$

The quantifier elimination unit 104 performs the process of the QE method described above, to the logical expression as in the expression (11) output from the logical expression substitution unit 103 as a result of the substitution process described above. FIG. 10 is a detail flowchart that describes the operation in FIG. 5 for the operation example 4. In FIG. 10, the same step numbers are assigned to the same steps as those in FIG. 5.

The logical expression substitution unit 103 computes a relational expression that includes only x, y, x11, z as the design variables, by applying the QE method to the expression (11) (step S501 in FIG. 10). In this case, in a similar manner as in the case of the operation example 3, since the expression (11) does not include any high-degree term for the design parameters, the quantifier elimination unit 104 carries out the QE method at a high speed.

After that, the sampling point generation unit 105 generates a sampling point group for the design variables (x11, x, y=28/x) remaining in the relational expression generated by the quantifier elimination unit 104 (step S502 in FIG. 10).

The possible range computation unit 106 decides whether or not there is any unprocessed sampling point in the sampling point group generated in step S502 (step S503 in FIG. 10). When the decision in step S503 is YES, the possible range computation unit 106 extracts one point from the sampling point group generated in step S502 (step S504 in FIG. 10).

The possible range computation unit 106 executes the calculation of the relational expression generated by the quantifier elimination unit 104 for the sampling point, to compute the value that the yield rate z may take, that is, the possible range of z, and computes the maximum value of z from the possible range (step S505 in FIG. 10). The possible range display unit 107 performs plotting on the two-dimensional coordinates with x11 and z as the axes respectively, to plot the relation between the x11 and z (step S506 in FIG. 10). In this case, since the size is fixed, the possible range display unit 107 may not perform plotting for x, y.

Figure 11:
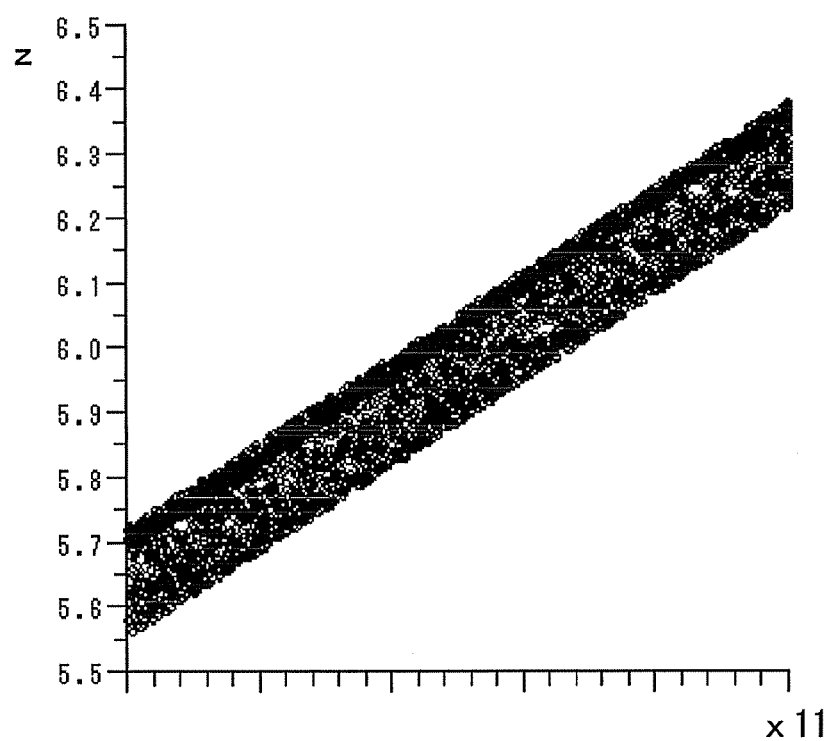
FIG. 11 is a diagram illustrating a plotting example by the possible range display unit corresponding to the operation example 4.

FIG. 11 illustrates a plotting example by the possible range display unit 107 corresponding to the operation example 4 described above, where the horizontal axis represents x11, and the vertical axis represents the yield rate z. The sampling point group generated in step S502 in FIG. 10 includes 3700 samples. In FIG. 11, the area in and below the shaded area is the possible range. Since the maximum value of z varies depending on the combination of X11, x, y, the line has thickness. From the plotting example, the estimated maximum value of the yield rate for each value of x11 is intuitively understood.

Figure 12A:
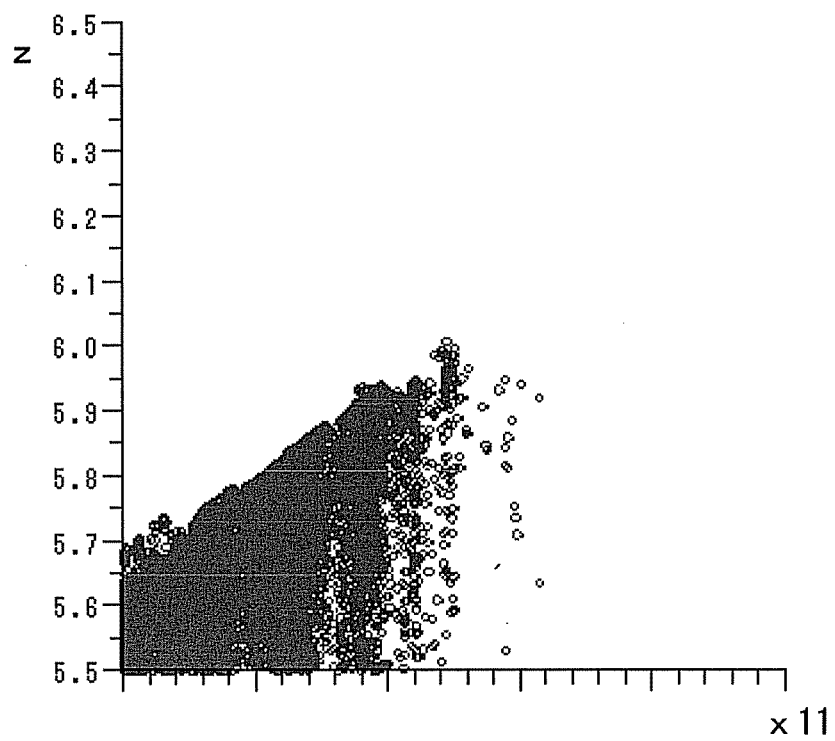
FIG. 12A and FIG. 12B illustrate comparison (1) of plotting examples by the conventional method and the embodiment corresponding to the operation example 4.
Figure 12B:
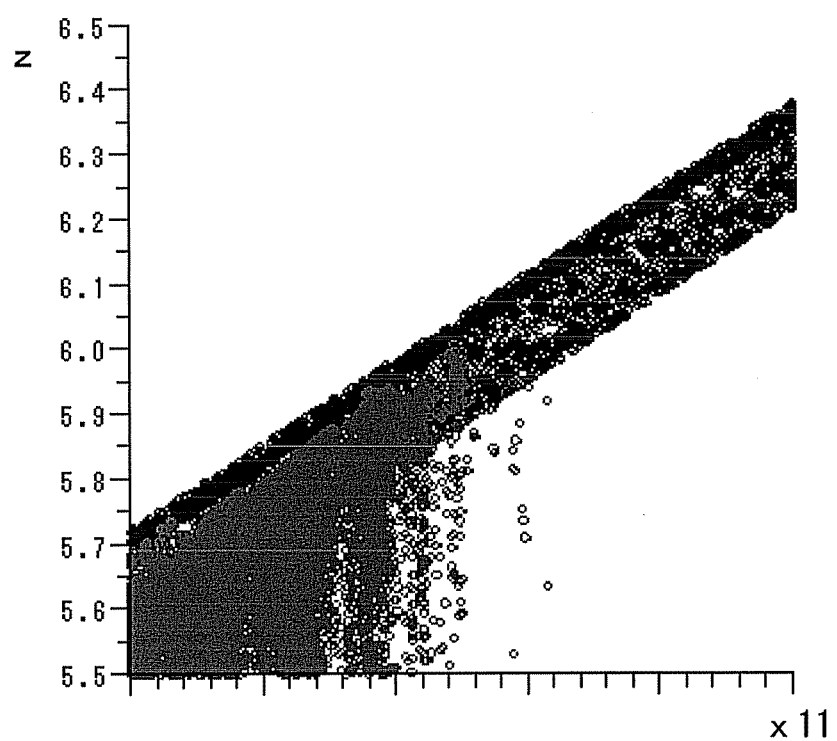

FIG. 12A illustrates a plotting example of the possible range of z for x11 obtained when conventional numerical calculation by a simulator is performed for the sampling point group of 30000 samples. FIG. 12B illustrates a plotting example in which a plotting example by the embodiment with 30000 samples and the plotting example in FIG. 12A by the conventional example are overlapped with each other. As is understood from these figures, the Pareto frontier is not obtained by the calculation in the conventional example, but according to the embodiment, although the calculation process is performed at a high speed, the Pareto frontier is obtained with good accuracy.

Figure 13A:
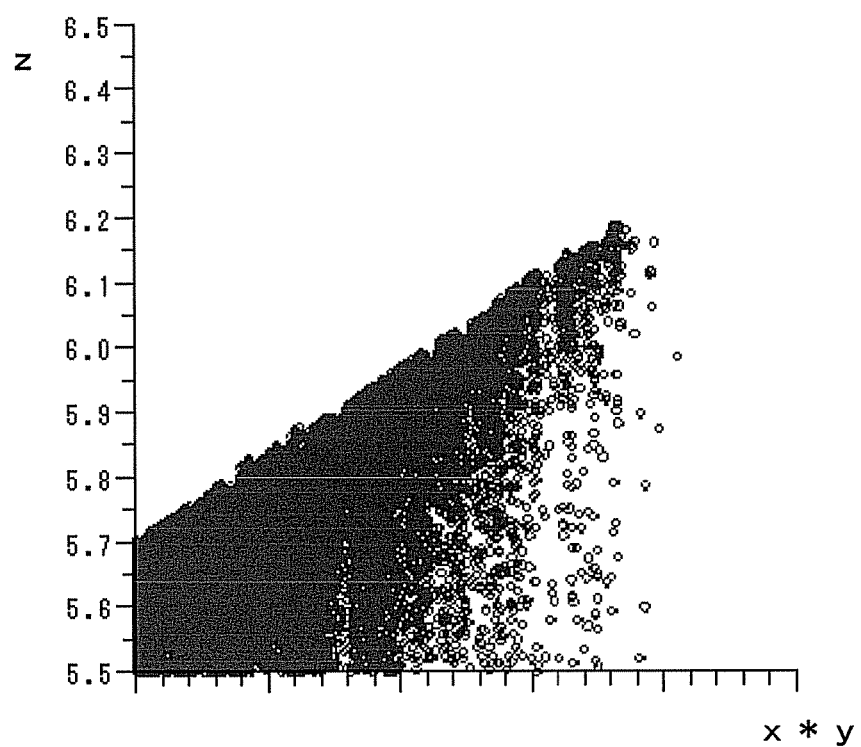
FIG. 13A and FIG. 13B illustrate comparison (2) of plotting examples by the conventional method and the embodiment corresponding to the operation example 4.
Figure 13B:
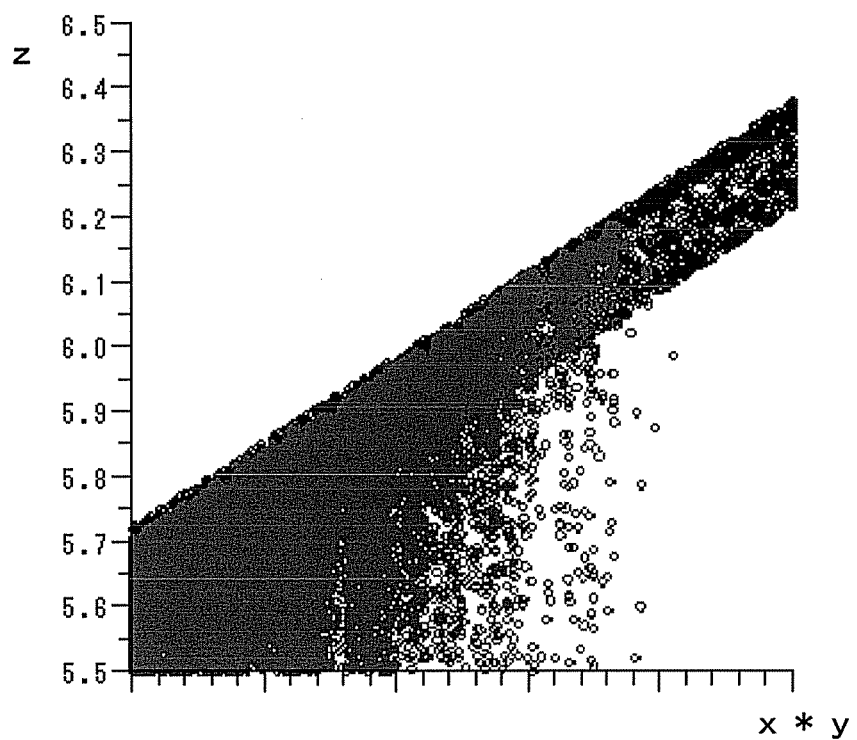

FIG. 13A illustrates a plotting example of the possible range of z for x11 obtained when conventional numerical calculation by a simulator is performed for the sample point group of 50000 samples. FIG. 13B illustrates a plotting example in which a plotting example by the embodiment with 50000 samples and the plotting example in FIG. 13A by the conventional example are overlapped with each other. As is understood from these figures, in the conventional example, even when the number of samples in the sampling point group is increased to 50000, z corresponding to the area with large values of x11 cannot be computed.

As an operation example 5 of the design support apparatus in FIG. 1, when the designer wants to find the relation of the yield rate, size and Vth, a constraint is set as follows based on the expression (1), the expression (3), the expression (6) and the expression (7) described above.

$$SNM = f1(x1, \ldots, x11)$$

$$WM = f2(x1, \ldots, x11)$$

$$\text{yield rate} = \min(SNM, WM)$$

$$0 < xi < 1 \, (i=1,2,\ldots,11)$$

$$\text{size} = (1+2*x4+3*x5)*(6+x2+x3)$$

$$V\text{th} = f3(x1, x4, x7)$$

Meanwhile, as an operation example 6 of the design support apparatus in FIG. 1, when the designer wants to find the relation of the yield rate, size and leak current, a constraint is set as follows based on the expression (1), the expression (3), the expression (6) and the expression (8) described above.

$$SNM = f1(x1, \ldots, x11)$$

$$WM = f2(x1, \ldots, x11)$$

$$\text{yield rate} = \min(SNM, WM)$$

$$0<xi<1 (i=1,2,\ldots,11)$$

$$size=(1+2*x4+3*x5)*(6+x2+x3)$$

$$Leak=f4(x1,x4,x7)$$

Since the operation example 5 and the operation example 6 differ only in the function for the Vth and Leak, explanation is made below using the example of the operation example 5.

The constraint in the operation example 5 is represented as a logic expression as follows.

$$\begin{aligned}ex(\{x1,x2,x3,x4,x5,x6,x7,x8,x9,x10,x11\},(0<x1<1) \text{ and} \\ (0<x2<1) \text{ and } (0<x3<1) \text{ and } (0<x4<1) \text{ and} \\ (0<x5<1) \text{ and } (0<x6<1) \text{ and } (0<x7<1) \text{ and} \\ (0<x8<1) \text{ and } (0<x9<1) \text{ and } (0<x10<1) \text{ and} \\ (0<x11<1) \text{ and } (1+2*x4+3*x5)*(6+x2+x3)=size \\ \text{and } f3(x1,x4,x7)=f \text{ and } SNM>z \text{ and } WM>z);\end{aligned} \quad (12)$$

For the part of size, the logical expression substitution unit 103 performs the factorization in a similar manner as in the cases of the operation example 3 and the like, and to substitute into the design variables x, y for each factor. Meanwhile, the part of f3 for Vth becomes a complicated polynomial as the function of the design parameters. The part of f4 for Leak is an exponent function that is a transcendental function. Therefore, the logical expression substitution unit 103 determines that these function expressions are to be calculated when the possible range display unit 107 performs the plotting, and performs a process such that the design variables (design parameters) x1, x4, x7 in the function expression remain in the relational expression after the QE method is applied. As a result, the logical expression substitution unit 103 substitute the logical expression (12) into a form as described as an expression (13) below.

$$\begin{aligned}ex(\{x2,x3,x5,x6,x8,x9,x10,x11\},(0<x1<1) \text{ and} \\ (0<x2<1) \text{ and } (0<x3<1) \text{ and } (0<x4<1) \text{ and} \\ (0<x5<1) \text{ and } (0<x6<1) \text{ and } (0<x7<1) \text{ and} \\ (0<x8<1) \text{ and } (0<x9<1) \text{ and } (0<x10<1) \text{ and} \\ (0<x11<1) \text{ and } (1+2*x4+3*x5)=x \text{ and } (6+x2+ \\ x3)=y \text{ and } SNM>z \text{ and } WM>z);\end{aligned} \quad (13)$$

Figure 14:
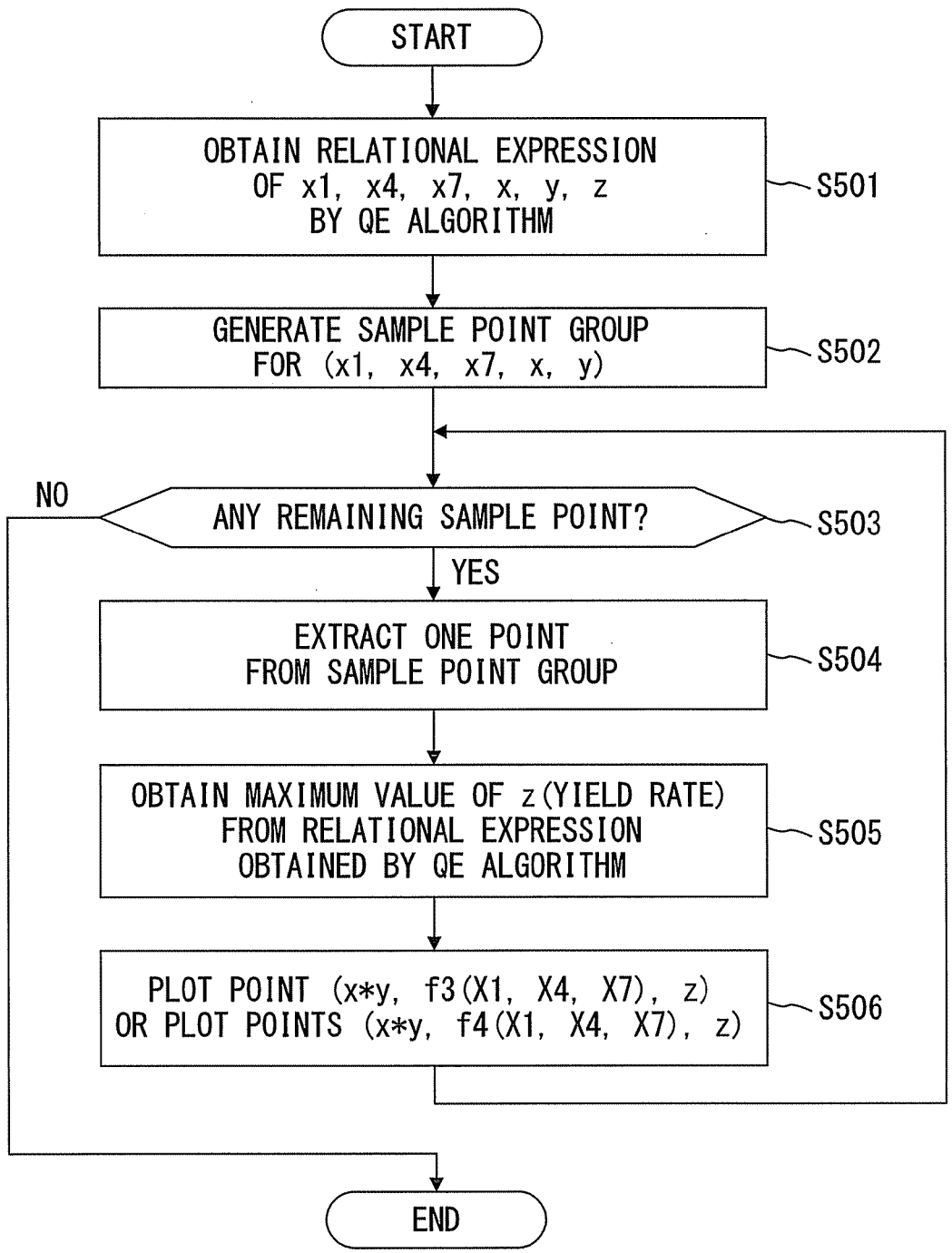
FIG. 14 is a detail flowchart that describes the operation in FIG. 5 for an operation example 5 or 6.

The quantifier elimination unit 104 performs the process of the QE method described above, to the logical expression as in the expression (13) output from the logical expression substitution unit 103 as a result of the substitution process described above. FIG. 14 is a detail flowchart that describes the operation in FIG. 5 for the operation example 5 or 6. In FIG. 14, the same step numbers are assigned to the same steps as those in FIG. 5.

The logical expression substitution unit 103 computes a relational expression that includes only x1, x4, x7, x, y, z as the design variables, by applying the QE method to the expression (13) (step S501 in FIG. 14).

After that, the sampling point generation unit 105 generates a sampling point group for the design variables (x1, x4, x7, x, y) remaining in the relational expression generated by the quantifier elimination unit 104 (step S502 in FIG. 14).

The possible range computation unit 106 decides whether or not there is any unprocessed sampling point in the sampling point group generated in step S502 (step S503 in FIG. 14). When the decision in step S503 is YES, the possible range computation unit 106 extracts one point from the sampling point group generated in step S502 (step S504 in FIG. 14).

The possible range computation unit 106 executes the calculation of the relational expression generated by the quantifier elimination unit 104 for the sampling point, to compute the value that the yield rate z may take, that is, the possible range of z, and computes the maximum value of z from the possible range (step S505 in FIG. 14).

The possible range display unit 107 calculates the value x*y corresponding to the size, f3(x1, x4, x7) corresponding to Vth or f4 (x1, x4, x7) corresponding to Leak, according to the sampling point. The possible range display unit 107 then performs plotting on the three-dimensional coordinates with x*y, f3(x1, x4, x7) or f4(x1, x4, x7) and z as the axes respectively, based on the values of x*y, f3(x1, x4, x7) or f4(x1, x4, x7) and z corresponding to them, to display the relation between the size, Vth or Leak and z (step S506 in FIG. 14).

As described above, in the case when a logical expression for the Vth or Leak including complicated function of a design parameter, by eliminating the function parts by the logical expression substitution unit 103, the QE method may be performed at a high speed. In addition, since the possible range display unit 107 calculates the function values when it performs the plotting, appropriate plotting is performed.

Figure 15:
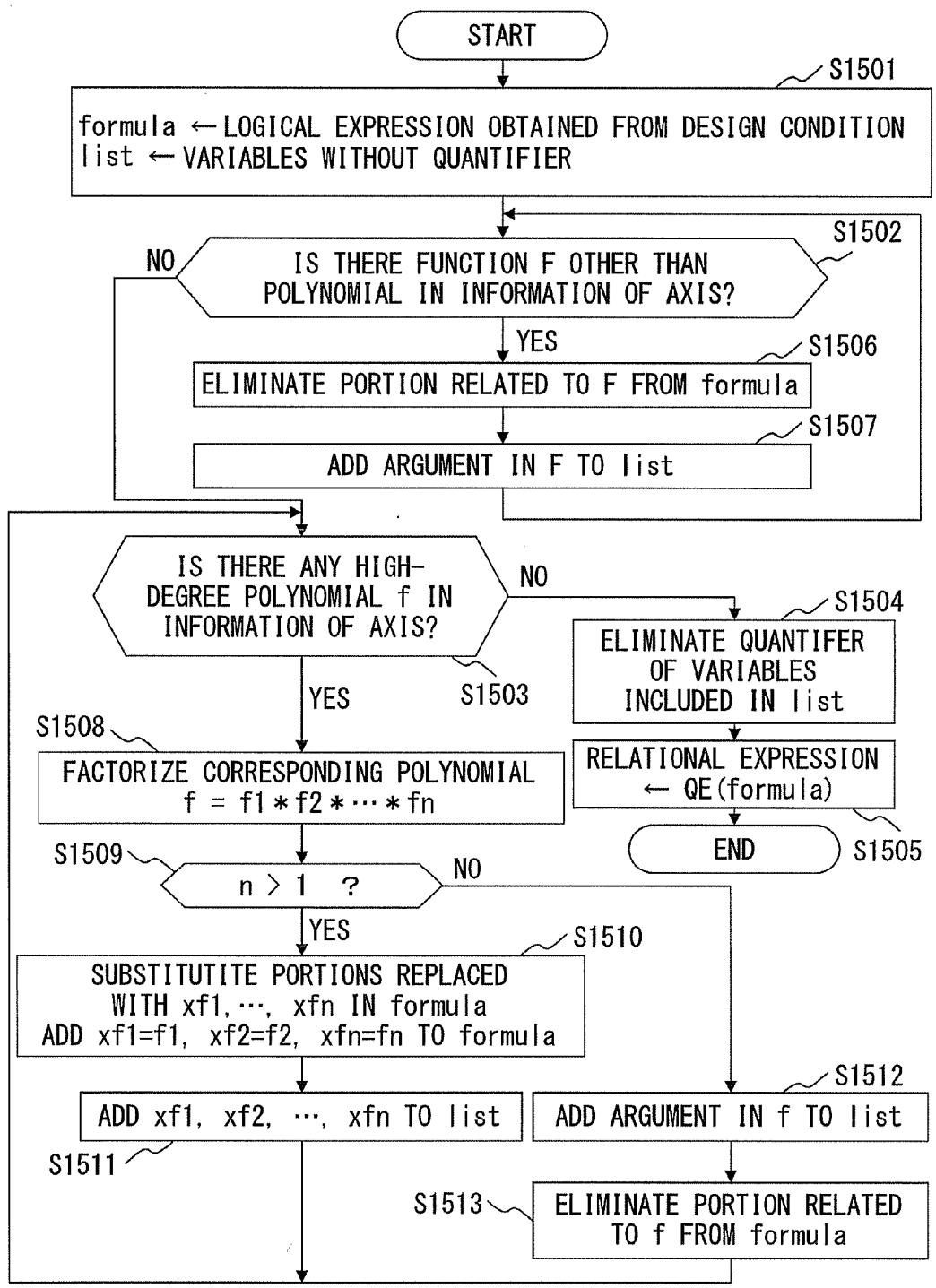
FIG. 15 is a flowchart describing operations of a logical expression substitution unit and a quantifier elimination unit in FIG. 1 for realizing operation examples 1-6.
Figure 16:
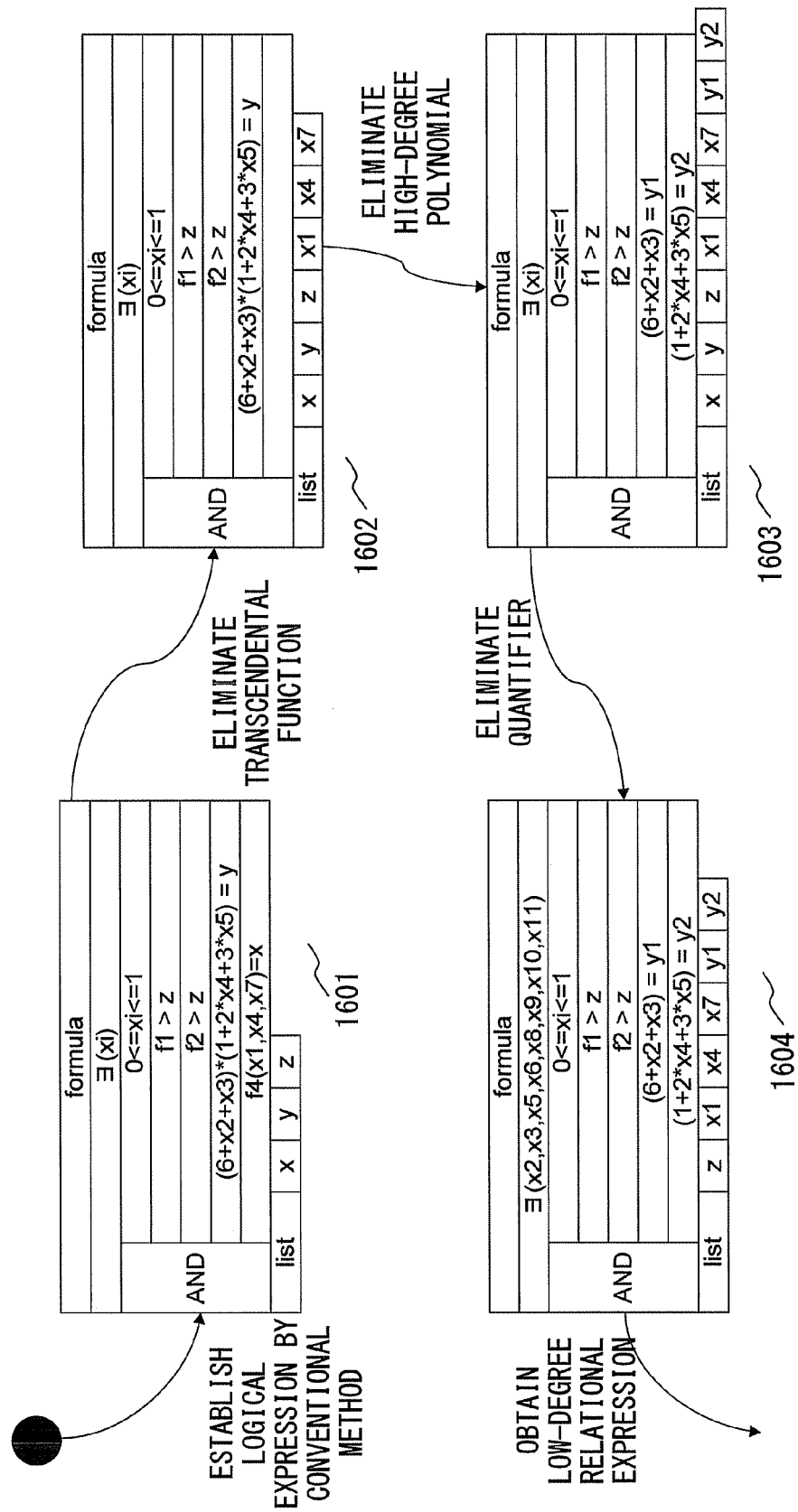
FIG. 16 is a data structure diagram in the operations of the logical expression substitution unit and the quantifier elimination unit in FIG. 1 for realizing operation examples 1-6.

FIG. 15 is a flowchart describing the operations of the logical expression substitution unit 103 and the quantifier elimination unit 104 for realizing the operation examples 1-6, and FIG. 16 illustrates the data structures in the operations.

As illustrated in FIG. 16, the logical expression substitution unit 103 stores the logical expression input by the logical expression input unit 102 in a formula area on the memory, and stores the group of variables without a quantifier in a list area on the memory (step S1501).

When the information of the coordinate axes does not include a function F other than a polynomial or a high-degree polynomial f, the decision in steps S1502 and S1503 become NO, and step S1504 is executed. Here, the logical expression substitution unit 103 eliminates the quantifiers of the variables included in the list area (see FIG. 16) from a quantifier description area in the formula area (transition from the state of 1603 to the state of 1604 in FIG. 16). After that, the quantifier elimination unit 104 applies the QE method to the logical expression in the formula area to compute a relational expression that includes no quantifier.

When the information of a coordinate axis includes a function F other than a polynomial as in the operation example 6 described above, the decision in step S1502 becomes YES. As a result, the logical expression substitution unit 103 eliminates the portion related to F in the formula area (step S1506), and adds arguments (design variables) in F to the list area (step S1507). This operation is described as the state transition from 1601 to 1602 in FIG. 16 for example.

When the information of a coordinate axis includes a high-degree polynomial f as in the operation examples 3-5, the decision in step S1503 becomes YES. In this case, the logical expression substitution unit 103 factorizes the corresponding polynomial first (step S1508). The logical expression substitution unit 103 checks whether or not the number n of the factors is larger than 1 (step S1509).

When the number n of the factors is larger than 1, the logical expression substitution unit 103 substitute each factor in the formula area with new substitution variables, adds the contents of the substitution to the formula area (step S1509-S1510), and further adds the new substitution variables to the list area (step S1511). This corresponds to the operation example 3 or 4 described above. After that, the logical expression substitution unit 103 returns to the decision process in the step S1503.

When the number of n of the factor is 1, the logical expression substitution unit 103 adds the arguments of f to the list area (step S1509, S1512), and eliminates the portion related to f from the formula area (step S1513). After that, the logical expression substitution unit 103 returns to the decision process in the step S1503.

By the process described above, the logical expression substitution unit 103 substitutes the logical expression so that the calculation for the QE method by the quantifier elimination unit 104 does not become complicated.

According to the first embodiment described above, the possible range display unit 107 is able to display a possible range as described in FIG. 7 for example. Then, the designer is able to intuitively understand the estimated maximum value of the yield rate for each size based on such a plotting example. However, some designers may request to obtain the relation between the size and the maximum value of the yield rate not only from the plotting area on the display but also as a function expression.

Figure 17:
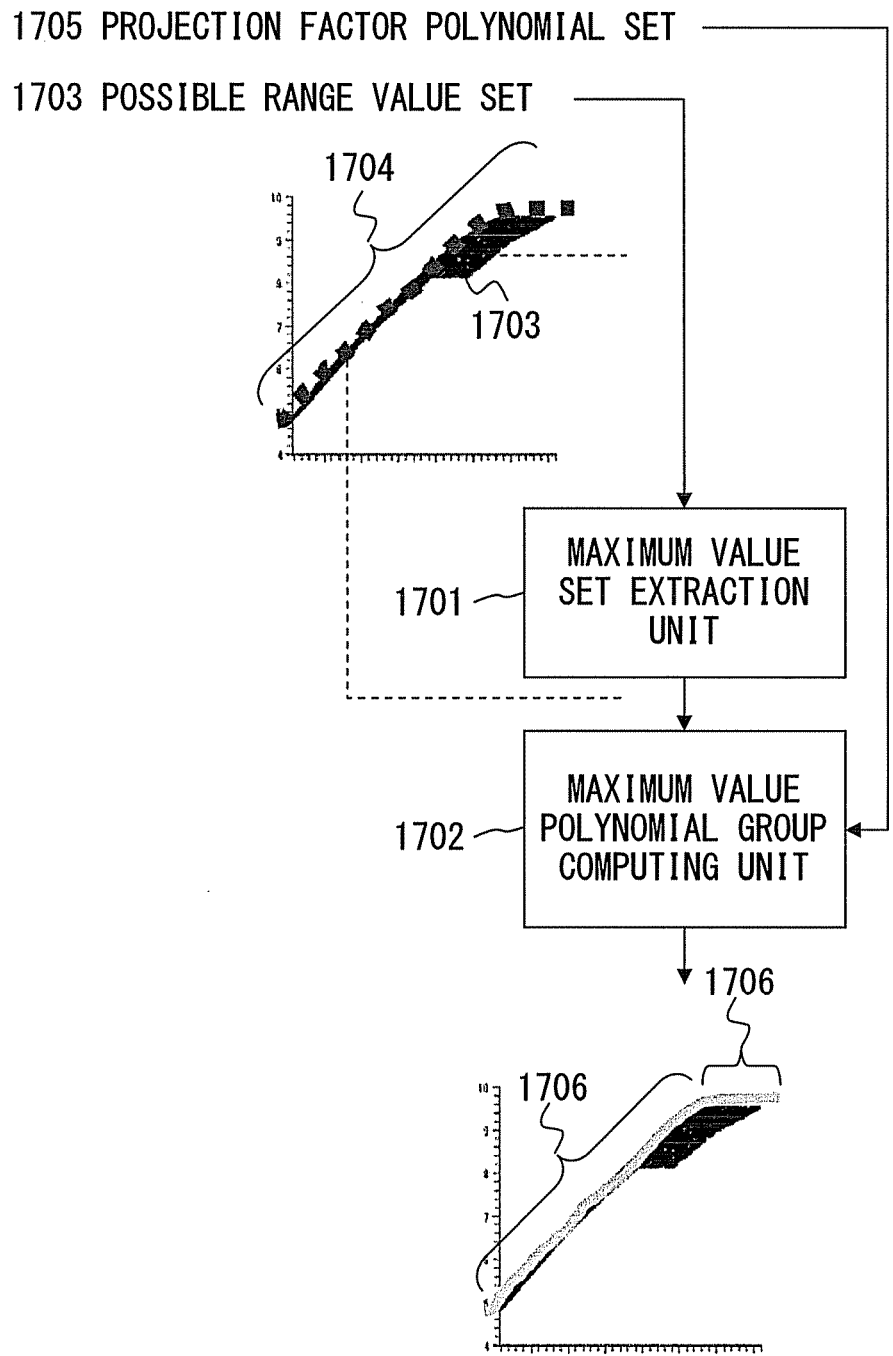
FIG. 17 is a configuration diagram of the second embodiment of the design support apparatus.

FIG. 17 illustrates the configuration of the second embodiment of the design support apparatus that makes it possible to obtain the relation between the size and the maximum value of the yield rate as a function expression.

The configuration of the second embodiment calculates the relation between the size and the maximum value of the yield rate as a function expression, for example, by adding some functions to the configuration of the first embodiment of the design support apparatus illustrated in FIG. 1.

In FIG. 17, a maximum value set extraction unit 1701 extracts a maximum value set 1704 of values that the yield rate z may take, for each sampling point, from a possible range value set 1703 that has been calculated by the possible range computation unit 106 illustrated in FIG. 1. The maximum value set 1704 is input to a maximum value polynomial group computing unit 1702. To the maximum value polynomial group computing unit 1702, a projection factor polynomial set 1705 is also input from the quantifier elimination unit 104 in FIG. 1.

While dividing the area of the maximum value set 1704 input from the maximum value set extraction unit 1701, the maximum value polynomial group computing unit 1702 selects, for each divided area, a projection factor that fits the maximum value set 1704 in the area the most, from the projection factor polynomial set 1705. The maximum value polynomial group computing unit 1702 then outputs the projection factors obtained for the respective divided areas as a maximum value polynomial group 1706.

The operation of the second embodiment configured as described above is explained below.

As described above, the quantifier elimination unit 104 in FIG. 1 eliminates a design variable (=design parameter) to which a quantifier is attached, from a logical expression output from the logical expression substitution unit 103, using the QE method. Regarding the details of the QE method, as mentioned above, the related-art document 1 discloses the outline of the processing method. Furthermore, as the same series, related-art document 2 (Keisan jitsudaisu kika nyumon: QE niyoru saitekika to sono oyou [Introduction to computational real algebraic geometry: optimization by QE and its application], Nippon Hyoronsha, Sugaku semina [Mathematics Seminar] Vol. 555 (December-2007 issue), pp. 75-81.), related-art document 3 (Keisan jitsudaisu kika nyumon: CAD arugorizumu (zenpan) [Introduction to computational real algebraic geometry: CAD argorithm (first half)], Sugaku semina [Mathematics Seminar] Vol. 556 (January-2008 issue), pp. 76-83.), related-art document (Keisan jitsudaisu kika nyumon: CAD arugorizumu (kouhan) [Introduction to computational real algebraic geometry: CAD argorithm (second half)], Sugaku semina [Mathematics Seminar] Vol. 557 (march-2008 issue), pp. 79-85.) and related-art document 5 (Keisan jitsudaisu kika nyumon: CAD niyoru QE [Introduction to computational real algebraic geometry: QE by CAD], Sugaku semina [Mathematics Seminar] Vol. 558 (April-2008 issue), pp. 82-89.) disclose the details of the processing method. The quantifier elimination unit 104 in FIG. 1 performs the QE process based on a technique called CAD (Cylindrical Algebraic Decomposition) in accordance with the method described in the related-art documents 1-5, to eliminate a design variable (=design parameter) to which a quantifier is attached. The outline of the QE process based on CAD is described below.

First, the logical expression that is an algebraic proposition as represented as the expression (10), (11) or (13) input from the logical expression substitution unit 103 in FIG. 1 is represented as the following expression in a general way.

$$(Qk+1xk+1)(Qk+2xk+2)\ldots(Qnxn)[\phi(x1,\ldots,xn))] \quad (14)$$

Each Qi represents quantifier $\forall$ or $\exists$. Here, xk+1, xk+2, ..., xn represent variables (design parameters) to which a quantifier is attached. Meanwhile, x1, ..., xk represent variables (design parameters) without a quantifier, which are referred to as free variables. $\phi$ is an algebraic proposition. The quantifier elimination unit 104 can obtain a logical expression being equivalent to the proposition and expressed by free variables without a quantifier, by calculating CAD with respect to the polynomials that appear for the proposition. This is called QE using CAD.

Specifically, the quantifier elimination unit 104 first takes out polynomials from all inequalities that appear in the proposition (14), and the set of the polynomials is assumed as F. Each polynomial in the polynomial set belongs to a polynomial set R [x1, ..., xn] of real coefficients including free variables x1, ..., xk and variables xk+1, xk+2, ..., xn to which a quantifier is attached.

The quantifier elimination unit 104 performs a process called a "projection stage" illustrated in FIG. 18. Here, the polynomial set F is converted into a polynomial set F1 in which a design parameter xn in the set is regarded as a dependent variable and the number of variables is reduced by one. That is, each polynomial in the polynomial set F1 belong to the polynomial set R [x1, ..., xn−1] with real coefficients including variables x1, ..., xn−1. Next, in a similar manner, the polynomial set F1 is converted into a polynomial set F2 in which a design parameter xn−1 is regarded as a dependent variable and the number of variables is further reduced by one. That is, each polynomial in the polynomial set F2 belong to the polynomial set R [x1, xn−2] with real coefficients including variables x1, ..., xn−2. Subsequently, polynomial sets in which the number of variables is sequentially reduced by one are obtained in a similar manner, and ultimately, a polynomial set Fn−1 belonging to a polynomial set R[x1] with a real coefficient including only the variable x1 is obtained. The process as described above to generate polynomial sets F1, F2, ... Fn−2, Fn−1 in which the number of variables is sequentially reduced by one from the polynomial set F is called Projection. In FIG. 18, one projection is described as "PROJ". Therefore, the repetition of the projection for n−1 times is described as "$F_{n-1}=PROJ^{n-1}(F)$". Here, each Fi ($1 \leqq I \leqq n-1$) is called a projection factor.

Next, the quantifier elimination unit 104 performs a process called a "base stage" illustrated in FIG. 18. Here, in each polynomial of the projection factor Fn−1 that includes only one variable x1 obtained in the "projection stage" described above, the real roots are obtained and the respective roots are separated. Then, points (referred to as sample points) consisting of an arbitrary value between the respective adjacent calculated real roots and each real root are computed. In FIG. 18, the points consisting of each real root "●" and each arbitrary point represented by an outline circle are the sample points.

The quantifier elimination unit 104 performs a process called a "lifting stage" illustrated in FIG. 18. Here, one of the sample point group obtained in the "base stage" is selected, and the coordinate values of the sample point is substituted into the projection factor Fn−2 of the immediately-above level. As a result, in the polynomial of the projection factor Fn−2 including only one variable x2, the real roots are obtained and the respective real roots are separated. Then, points (referred to as sample points) consisting of an arbitrary value between the respective adjacent calculated real roots and each real root are computed. This process is performed for all the sample points obtained in the "base stage". Each section represented by each sample point is called a "cell", and the dividing process is called a "cell decomposition". Here, the cell corresponding to the projection factor Fn−2 is represented by an inequality and the like of the variable x1 that defines the range in which the sample point of the projection factor Fn−1 that caused the generation of the cell is included, and an inequality and the like of the variable x2 that defines the range of the sample point of the cell itself. When all the sample points are computed for the projection factor Fn−2, a similar cell decomposition process is performed for the projection factor Fn−3 using each sample point obtained for the projection factor Fn−2. The cell decomposition process in the "lifting stage" described above is repeated until the sample points for each cell corresponding to the projection factor Fn−k are obtained as illustrated in FIG. 18.

As described above, the projection factor Fn−k expressed only by the free variables x1, . . . , xk without a quantifier and the sample points of respective cells corresponding to the projection factors are obtained. Then the quantifier elimination unit 104 calculates the proposition represented as the expression (14) input from the logical expression substitution unit 103 using the respective sample points corresponding to the projection factor Fn−k. When the proposition is satisfied, the cell corresponding to the sample points is selected as a "valid cell". Here, each cell corresponding to the projection factor Fn−k is represented by inequalities of variables x1, . . . , xk−1 expressing cells corresponding to the sample points of the projection factor Fn−k+1 that caused the generation of the cells, and inequalities and the like of the variables xk that defines the range of the sample points of the respective cells corresponding to the projection factor Fn−k itself. Therefore, when a cell is selected as a valid cell, inequalities and the like representing the cell is stored. The calculation process and the selection process are performed for all the sample points corresponding to the projection factor Fn−k. Then, the quantifier elimination unit 104 outputs a logical expression consisting of the logical expression of the inequalities and the like corresponding to the respective cells selected as the valid cell and the logical expression of the polynomial constituting the projection factor Fn−k, as a logical expression equivalent to the proposition described in the expression (13) input from the logical expression substitution unit 103. As is understood from the description above, the output logical expression is represented by the free variables x1, . . . , xk without a quantifier. Thus, the variables (design parameters) xk+1, xk+2, xn with a quantifier are eliminated.

In the relational expression generated by the quantifier elimination unit 104 as described above, the sampling point generation unit 105 generates a sampling point group of the design variables (free variables) remaining in the relational expression. Then, the possible range computation unit 106 calculates, for each sampling point, the values of the remaining design variables included in the relational expression generated by the quantifier elimination unit 104, to compute the possible range that the relational expression may take, and the possible range display unit 107 displays the possible range.

In this case, the relational expression generated by the quantifier elimination unit 104 consists of the polynomial constituting the projection factor Fn−k, as described above. Therefore, the outline or shape of the possible range displayed as illustrated in FIG. 7 for example should be formed based on the polynomial constituting the projection factor Fn−k. For this reason, the outline of the maximum-value boundary of the possible range illustrated as 1704 in FIG. 17 for example should also be formed based on the polynomial constituting the projection factor Fn−k.

Therefore, in the second embodiment, the maximum value set extraction unit 1701 in FIG. 17 first extracts the maximum value set 1704 of the values that the yield rate z may take, for each sampling point, from the possible range value set 1703 calculated by the possible range computation unit 106. This operation is realized as an operation of selecting, from the possible range value set 1703, the maximum value of z corresponding to a design variable value (for example, x*y) constituting each sampling point, for example.

Next, the maximum value polynomial group computing unit 1702 inputs, together with the maximum value set 1704, the polynomial constituting the projection factor Fn−k calculated in the CAD process described above by the quantifier elimination unit 104, as a projection factor polynomial set 1705. The maximum value polynomial group computing unit 1702 performs matching between the maximum value set 1704 and each polynomial in the projection factor polynomial set 1705, to select and output one or more polynomials that most appropriately represent the maximum value set 1704. Accordingly, it becomes possible for the designer to obtain a polynomial that represents the maximum value boundary of the possible range.

FIG. 19 illustrates an example of the operation flowchart that describes the operation of the maximum value polynomial group computing unit 1702. The operation flowchart describes, for the sake of simplification of the explanation, the process in the case where k=1 in the expression (14) described above, that is, the case of calculating the possible range in the relation between one design variable x1 and the design variable z representing the yield rate for example.

In this case, a set PF={hi} of polynomials s constituting the projection factor Fn−k=Fn−1 is input from the quantifier elimination unit 104 in FIG. 1 to the maximum value polynomial group computing unit 1702 in FIG. 17 as the projection factor polynomial set 1705. Meanwhile, as auxiliary information, sample points SP1={$P_1$, . . . , $P_k$} are input from the quantifier elimination unit 104 to the maximum value polynomial group computing unit 1702. Here, the sample points SP1={$P_1$, . . . , $P_k$} consists of the real roots $P_1$, . . . , $P_L$ ($P_1$< . . . <$P_L$) and values $P_{L+1}$, . . . , $P_k$ between the respective adjacent real roots (step S1901 in FIG. 19).

Next, for the design variable x1, a range $D_i$ illustrated in step S1902 of FIG. 19 is defined. In each range $D_i$ defined as described above, H illustrated in step S1903 in FIG. 19 is calculated for all j. In this calculation, for each $D_i$, the distance H between the maximum value set 1704 and each polynomial $h_j$ included in the range $D_i$ is calculated. Then, for each $D_i$, the polynomial h for which the distance H calculated in step S1903 is minimum is output as the desired polynomial that most appropriately represents the maximum value outline of the possible range in the range $D_i$ (step S1904 in FIG. 19).

The processes of steps S1903 and S1904 above are performed for each range $D_i$. As a result, the maximum value polynomial group computing unit 1702 outputs the combination of each range $D_i$ and the polynomial corresponding to the range as a maximum value polynomial group 1706 that most appropriately represents the maximum value outline of the possible range.

As a simple example, it is assumed that a proposition corresponding to the expression (14) mentioned above is given as the following expression.

$$z(\theta) = \min_x f(x) = x_1 x_2,$$

$$2x_1 + x_2 \geq \theta,$$

$$x_1 + 3x_2 \geq \theta/2,$$

$$-1 \leq x_1 \leq 1,$$

$$-1 \leq x_2 \leq 1,$$

$$0 \leq \theta \leq 1.$$

In the case of this proposition, CAD is formed for the following polynomial set, to eliminate the variables $x_1$ and $x_2$.

$$Z = x_1 x_2 \wedge 2x_1 + x_2 \geq \theta \wedge x_1 3x_2 \geq \theta/2 \quad \wedge -1 \leq x_1 \leq 1 \wedge -1 \leq x_2 \leq 1 \wedge 0 \leq \theta \leq 1.$$

Figure 20B:
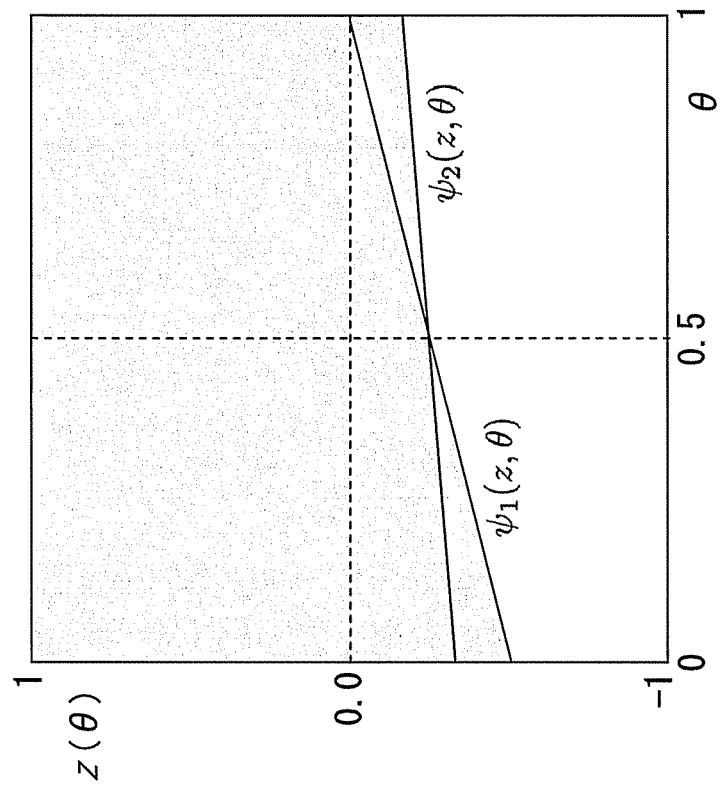
FIG. 20A and FIG. 20B are diagrams illustrating the operation of the embodiments.
Figure 20A:
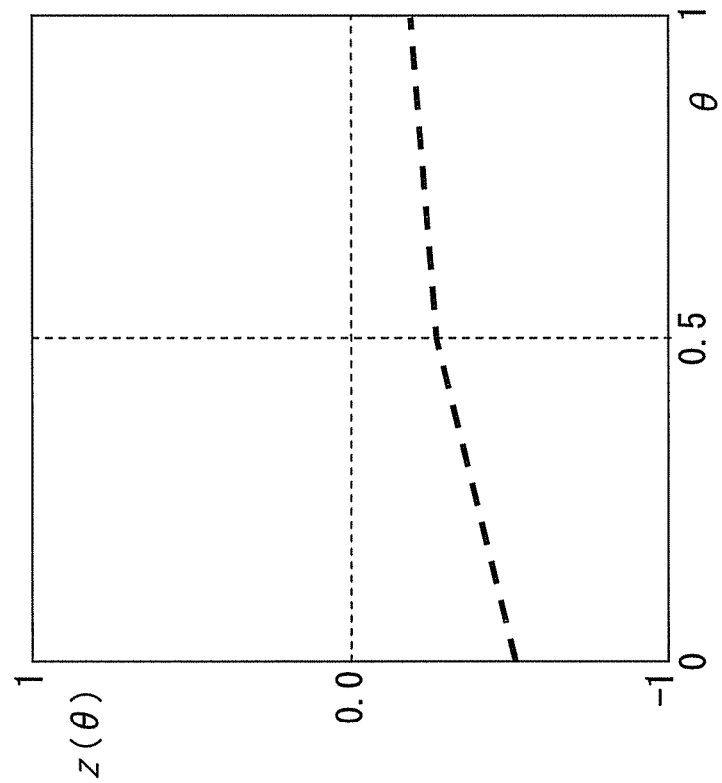

In this case, in the first embodiment, the possible range is only obtained as the numerical plotting display as illustrated in FIG. 20A. On the other hand, in the second embodiment, polynomial groups $\Psi 1(z, \theta)$ and $\Psi 2(z, \theta)$ represented by the following expressions are output as the maximum value polynomial group 1706, from the projection factor polynomial set 1705 obtained in the CAD process.

$$\Psi 1(z,\theta): [[z-1 \leq 0, 2z-\theta+1 \geq 0]]$$

$$\Psi 2(z,\theta): [[z-1 \leq 0, 6z-\theta+2 \geq 0]]$$

As described above, the designer can understand the maximum value outline of the possible range as an appropriate polynomial, and manufacturing design can be performed with more flexibility.

Figure 21:
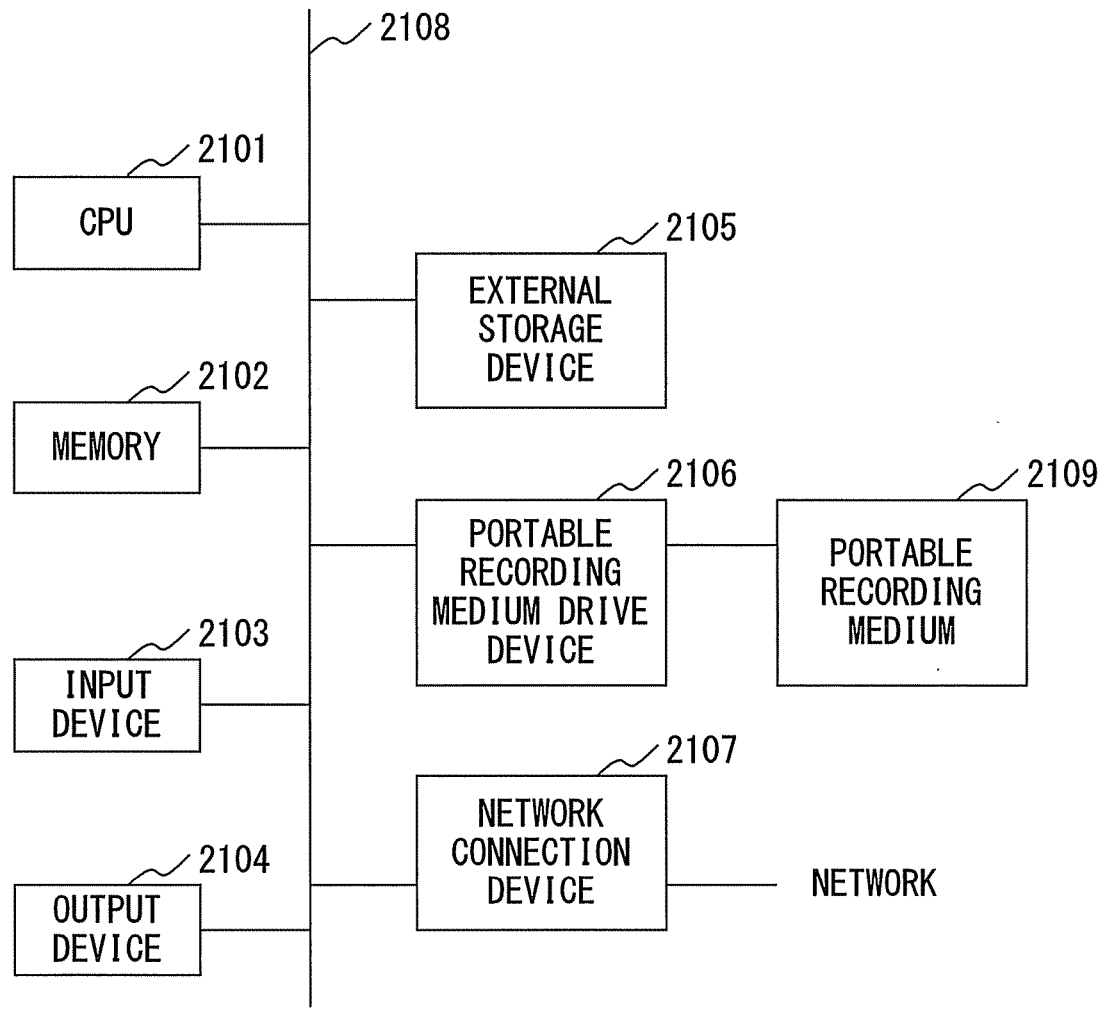
FIG. 21 is a hardware configuration diagram of a computer that realizes the embodiments.

FIG. 21 illustrates an example of the hardware configuration of a computer that is capable of realizing the design support apparatus illustrated in FIG. 1.

The computer illustrated in FIG. 21 has a CPU 2101, a memory 2102, an input device 2103, an output device 2104, an external storage device 2105, a portable recording medium drive device 2106 in which a portable recording medium 2109 is inserted, and a network connection device 2107, which are connected with each other by a bus 2108. The configuration illustrated in FIG. 21 is an example of a computer that is capable of realizing the system described above, and such a computer is not limited to this configuration.

The CPU 2101 performs the overall control of the computer. The memory 2102, which is realized by a RAM for example, temporality stores a program or data stored in the external storage device 2105 (or in the portable recording medium 2109) at the time of the execution of a program, data update, etc. The CPU 2101 performs the overall control by executing the program in the memory 2102.

The input device 2103 consists of, for example, a keyboard, a mouse and the like and interface control devices for them. The input device 2103 detects input operations using the keyboard, mouse and the like by a user and sends a notification of the detection result to the CPU 2101.

The output device 2104 consists of a display device, a printing device and the like and interface control devices for them. The output device 2104 outputs transmitted data to the display device and the printing device in accordance with the control by the CPU 2101.

The external storage device 2105 is, for example, a hard-disc storage device, which is mainly used for saving various data and programs. The portable recording medium drive device 2106 accommodates the portable recording medium 2109 such as an optical disc, SDRAM, compact flash and the like, and works as a supplement for the external storage device 2105. The network connection device 2107 is a device for connecting the communication line of, for example, a LAN (local area network) or a WAN (wide area network).

The design support apparatus according to the first embodiment or the second embodiment is realized by the execution of a program having the functions required for the above described operation by the CPU 2101. The program may be distributed by recording it in the external storage device 2105 or the portable recording medium 2109, or may be obtained from a network by means of the network connection device 2107.

According to a disclosed art, it becomes possible for the designer to comprehend the relation between design variables accurately.

In addition, according to a disclosed art, since the input is an objective function approximation polynomial and a simple function expression, it becomes possible to display the relationship diagram between a plurality of types of design variables without performing simulator calculation, making it possible to obtain various intuitive comprehension.

Furthermore, according to a disclosed art, it becomes possible to apply the process of the quantifier elimination method, even when an input logical expression is complicated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A design support apparatus that provides a relation between design variables including a design parameter or a design condition, comprising:
   a logical expression input unit configured to input a logical expression expressing a design specification and including a function expression of the design variables and a quantifier attached to the design variable;
   a quantifier elimination unit configured to generate a relational expression including the design variables without the quantifier by eliminating the design variable to which the quantifier is attached from the logical expression;
   a sampling point generation unit configured to generate a plurality of sampling points corresponding to the design variables included in the relational expression;
   a possible range computation unit configured to compute, for each of the sampling points, a possible range that the relational expression takes, by calculating values of remaining design variables included in the relational expression based on the relational expression;
   a maximum value set extraction unit configured to extract a set of maximum values from the possible range as a maximum value set; and a maximum value polynomial group computing unit configured to input, as a projection factor polynomial set, polynomials of a projection factor computed in a process in which the quantifier elimination unit eliminate the design variable to which the quantifier is attached, and to output a polynomial group that most appropriately represents the maximum value set as a maximum value polynomial group, by matching the maximum value set with each polynomial in the projection factor polynomial set.

2. A non-transitory recording medium storing a design support program which enables a computer to perform a design support procedure to provide a relation between design variables including a design parameter or a design condition, the procedure comprising:

inputting a logical expression expressing a design specification and including a function expression of the design variables and a quantifier attached to the design variable;

generating a relational expression including the design variables without the quantifier by eliminating the design variable to which the quantifier is attached from the logical expression;

generating a plurality of sampling points corresponding to the design variables included in the relational expression;

computing, for each of the sampling points, a possible range that the relational expression-takes, by calculating values of remaining design variables included in the relational expression based on the relational expression;

extracting a set of maximum values from the possible range as a maximum value set;

inputting, as a projection factor polynomial set, polynomials of a projection factor computed in the process of eliminating the design variable to which the quantifier is attached; and outputting a polynomial group that most appropriately represents the maximum value set as a maximum value polynomial group, by matching the maximum value set with each polynomial in the projection factor polynomial set.

* * * * *

UNITED STATES PATENT AND TRADEMARK OFFICE
CERTIFICATE OF CORRECTION

| | | |
|---|---|---|
| PATENT NO. | : 8,533,653 B2 | Page 1 of 1 |
| APPLICATION NO. | : 12/702425 | |
| DATED | : September 10, 2013 | |
| INVENTOR(S) | : Hirokazu Anai et al. | |

It is certified that error appears in the above-identified patent and that said Letters Patent is hereby corrected as shown below:

On the Title Page, Item (54) and in the Specification, In Column 1 (Title), Line 1, Before "SUPPORT" insert -- DESIGN --.

Signed and Sealed this
Twenty-eighth Day of January, 2014

Michelle K. Lee
*Deputy Director of the United States Patent and Trademark Office*